United States Patent
Miller

(10) Patent No.: US 8,596,219 B1
(45) Date of Patent: Dec. 3, 2013

(54) PET FEEDER

(71) Applicant: Kevin Miller, Bay Village, OH (US)

(72) Inventor: Kevin Miller, Bay Village, OH (US)

(*) Notice: Subject to any disclaimer, the term of this patent is extended or adjusted under 35 U.S.C. 154(b) by 0 days.

(21) Appl. No.: 13/735,245

(22) Filed: Jan. 7, 2013

Related U.S. Application Data

(62) Division of application No. 12/432,580, filed on Apr. 29, 2009, now Pat. No. 8,347,817.

(60) Provisional application No. 61/048,776, filed on Apr. 29, 2008.

(51) Int. Cl.
*A01K 5/02* (2006.01)

(52) U.S. Cl.
USPC ....... 119/56.1; 119/54; 119/52.02; 119/57.91

(58) Field of Classification Search
USPC ......... 119/51.02, 51.01, 52.1, 54, 56.1, 57.91
See application file for complete search history.

(56) References Cited

U.S. PATENT DOCUMENTS

| | | | | |
|---|---|---|---|---|
| 3,195,508 A | * | 7/1965 | Lehman et al. | 119/51.11 |
| 3,487,433 A | * | 12/1969 | Fleming | 119/51.04 |
| 3,643,632 A | * | 2/1972 | Poirot | 119/54 |
| 3,730,142 A | * | 5/1973 | Kahrs et al. | 119/54 |
| 3,730,742 A | | 5/1973 | Kahrs et al. | |
| 3,741,163 A | * | 6/1973 | Bush | 119/54 |
| 4,606,300 A | * | 8/1986 | Sterner | 119/51.04 |
| 4,922,856 A | * | 5/1990 | Sweeney, Jr. | 119/51.04 |
| 5,105,766 A | * | 4/1992 | Montgomery | 119/57.91 |
| 7,905,200 B1 | * | 3/2011 | Gaston et al. | 119/51.11 |
| 8,347,817 B1 | | 1/2013 | Miller | |

FOREIGN PATENT DOCUMENTS

WO 90/12497 1/1990

OTHER PUBLICATIONS

"The Yuppy Puppy Treat Machine Dog 'Gumball' Machine," http://www.jakesdoghouse.com/Dog-Treats/Other-Cool-Treats/The-Yuppy-Puppy-Treat-p . . . , accessible on Oct. 12, 2007.
Charlie White, "SnackShotz Dog Biscuit Launcher," http://gizmodo.com149713/snackshotz-dog-biscuit-launcher, Jan. 20, 2006.
"Dogmatic SnackShotz Treat Launcher," http://www.amazon.com/Dogmatic-210-SnackShotz-Treat-Launcher/dp/B000F7VB10/ref . . . , review dated Feb. 8, 2007.
Stills from http://www.dogmaticproducts.com/snackshotz.wmv accessed via link in NPL #2, Jan. 20, 2006.

* cited by examiner

*Primary Examiner* — Kristen C Hayes
(74) *Attorney, Agent, or Firm* — Calfee, Halter & Griswold LLP

(57) ABSTRACT

Methods and apparatus are provided for feeding a pet in a manner that engages the pet and provides stimulation and exercise. Exemplary apparatus for dispensing animal food include a food hopper for containing animal food operatively connected to a food handler that launches a portion or ration of the animal food away from the unit in response to detecting a triggering action of the animal.

19 Claims, 41 Drawing Sheets

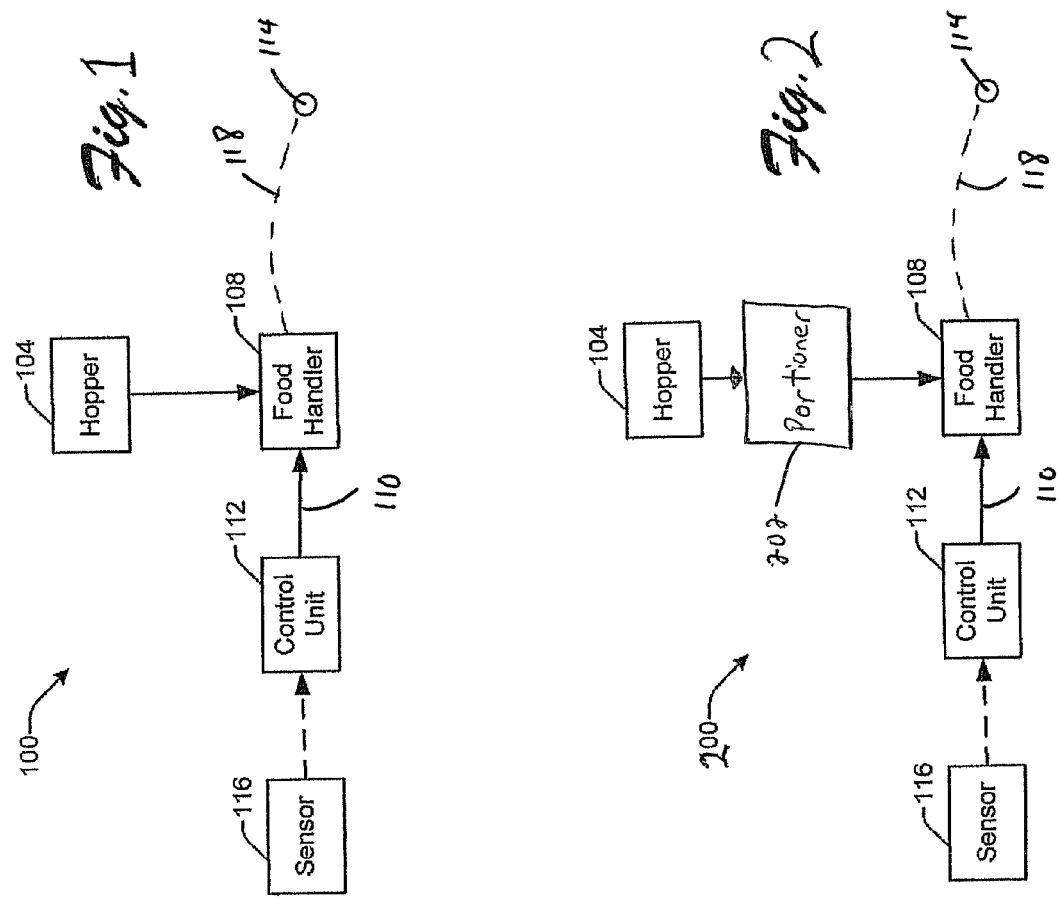

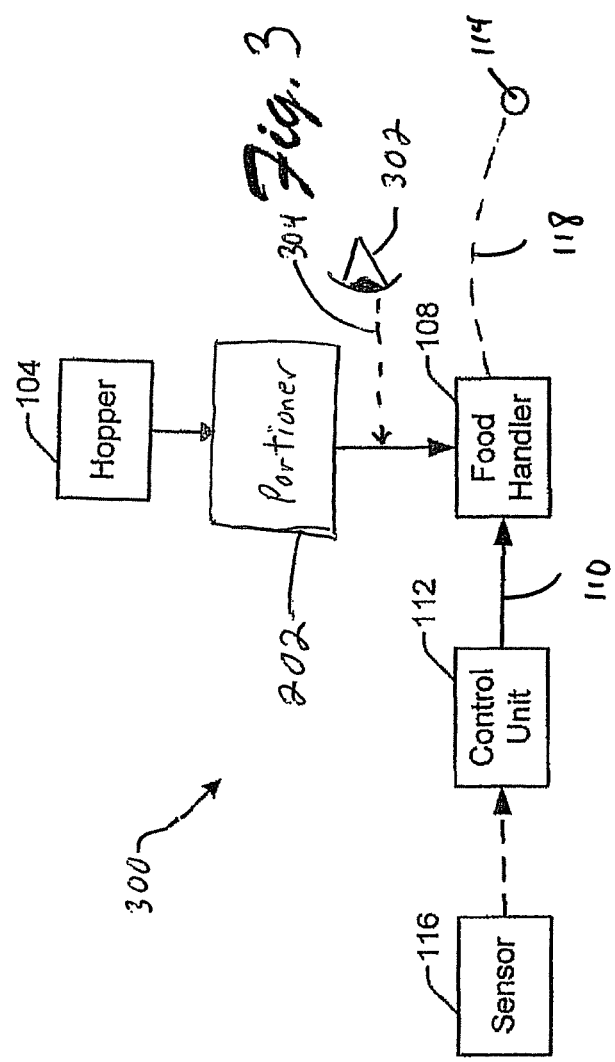

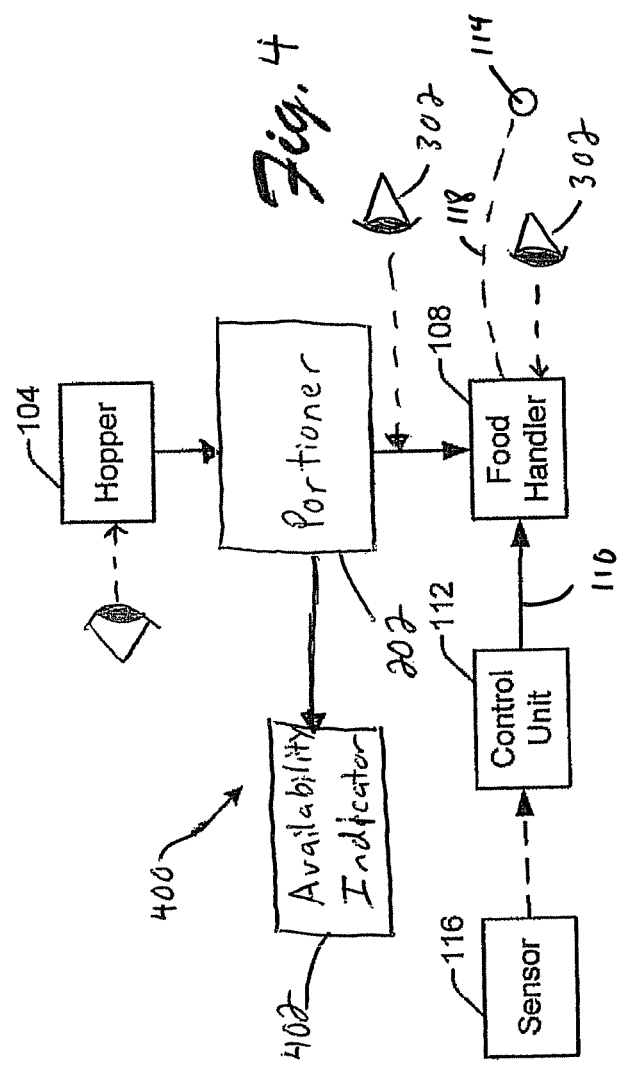

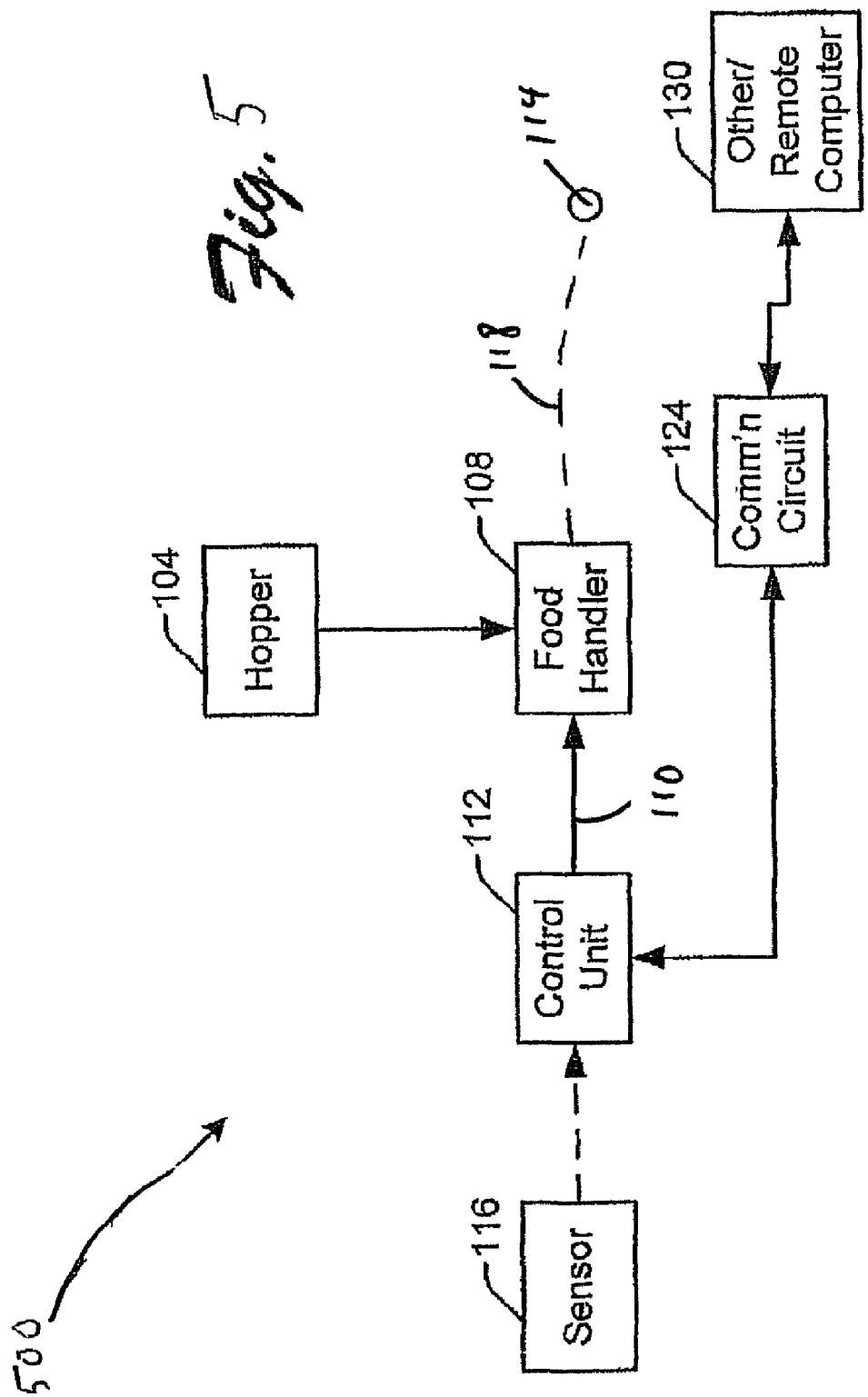

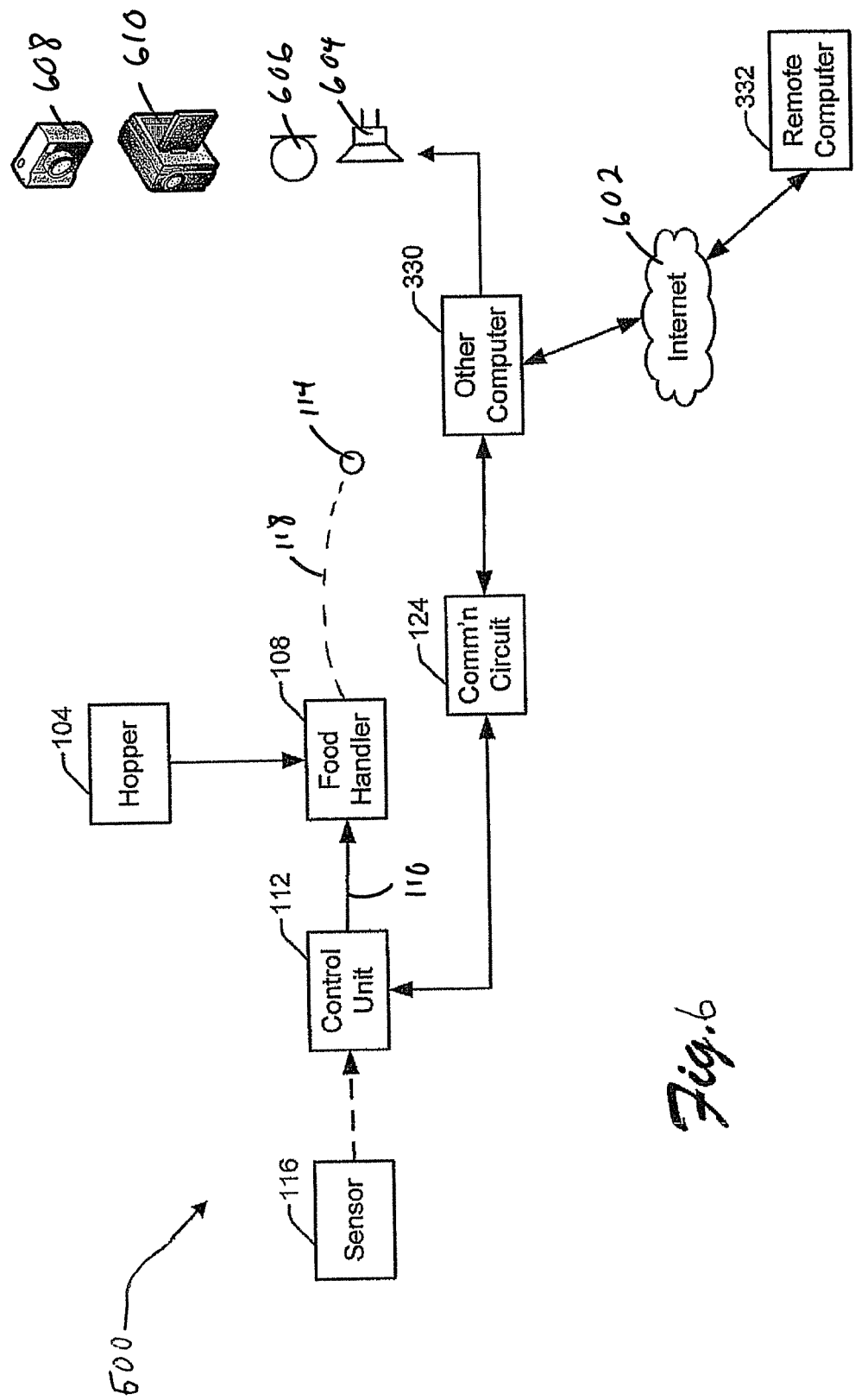

PET FEEDER

RELATED APPLICATION

This application is a divisional of and claims priority to, and any other benefit of, U.S. Non-Provisional patent application Ser. No. 12/432,580, filed Apr. 29, 2009, and entitled "PET FEEDER", which claims priority to, and any other benefit of, U.S. Provisional Patent Application No. 61/048/776, filed Apr. 29, 2008 and entitled "PLAYTIME PET FEEDER," both of which are herein incorporated by reference in their entireties.

FIELD OF THE INVENTION

The present invention relates generally to automatic pet feeders and, more specifically, to pet feeding systems and methods that automatically project pet food in response to a triggering action by a pet.

BACKGROUND

Many pet owners feed their pets my merely placing food in a container within reach of the pet. For a pet left unattended for hours at a time, it is not uncommon for food merely left in a container to not be fully consumed.

SUMMARY

According to the present invention, methods and apparatus are provided for feeding a pet in a manner that engages the pet and provides stimulation and exercise. Exemplary apparatus for dispensing animal food include a food hopper for containing animal food operatively connected to a food handler that launches a portion or ration of the animal food away from the unit in response to detecting a triggering action of the animal.

BRIEF DESCRIPTION OF THE DRAWINGS

FIG. 1 is a schematic illustration of an exemplary embodiment of an apparatus for dispensing animal food;

FIG. 2 is a schematic illustration of another exemplary embodiment of an apparatus for dispensing animal food;

FIG. 3 is a schematic illustration of another exemplary embodiment of an apparatus for dispensing animal food;

FIG. 4 is a schematic illustration of another exemplary embodiment of an apparatus for dispensing animal food;

FIG. 5 is a schematic illustration of another exemplary embodiment of an apparatus for dispensing animal food;

FIG. 6 is a schematic illustration of another exemplary embodiment of an apparatus for dispensing animal food;

FIG. 13D is a perspective view of parts of a food handler, a food portioner, and a food detector where a cam and drive ring that control the parts are rotated 180 degrees from the home position;

DESCRIPTION

Figure 7A:
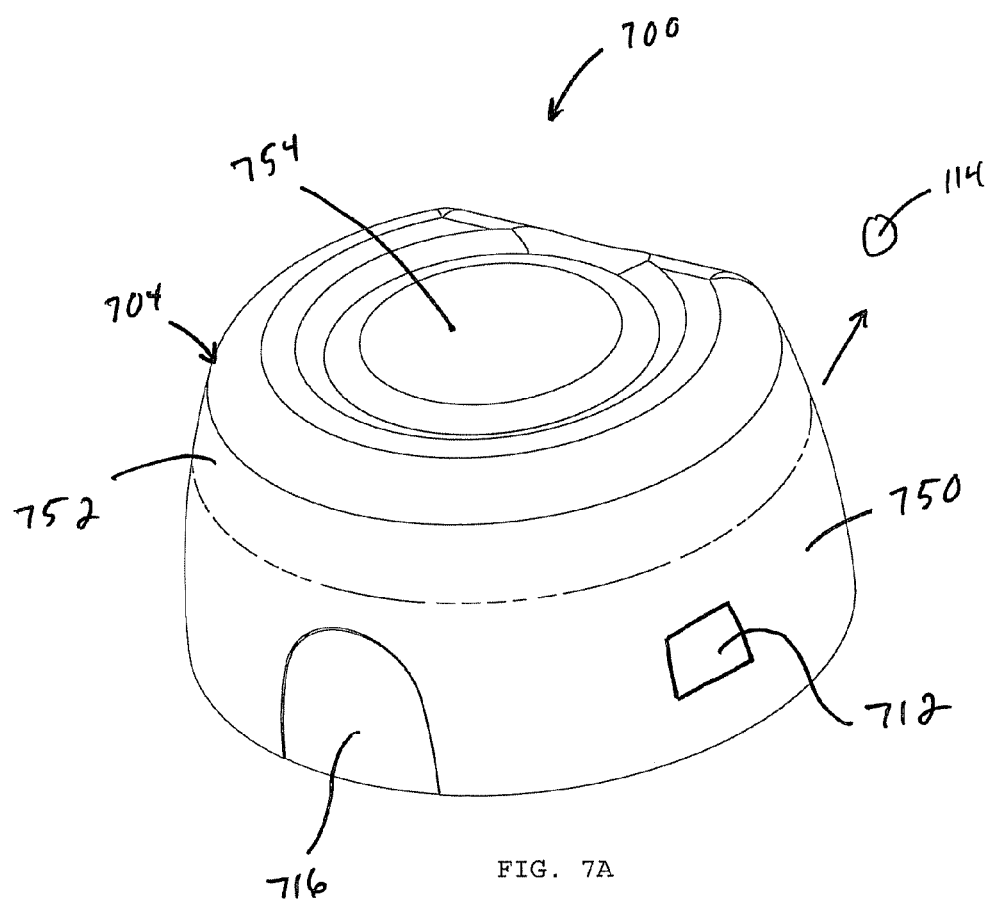
FIG. 7A is a perspective view of an exemplary embodiment of an apparatus for dispensing animal food.

Systems and methods for automatic pet feeding are presented. Exemplary apparatus and methods automatically project pet food pieces or portions in response to a triggering action by a pet.

Referring to FIG. 1, an exemplary apparatus 100 comprises a food hopper 104, a food handler 108, a control unit 112, and an animal sensor 116. The animal sensor 116 is configured to detect a triggering action of an animal other than a human. The food hopper 104 is configured to contain a supply of animal food. The food handler 108 is operatively connected to the food hopper 104. The control unit 112 is operatively connected to at least the animal sensor 116 and the food handler 108. When the animal performs the triggering action, the control unit 112 provides a signal to the food handler 108 as indicated by arrow 110. The signal 110 causes the food handler 108 to launch a portion 114 of the animal food away from the animal as indicated by dashed line 118. In an exemplary embodiment, the food portion 114 is launched in at least a horizontal direction away from the animal in response to the signal 110 from the animal sensor 116 that indicates detection of the triggering action. The portion 114 may be launched in a substantially horizontal direction (i.e. less than 45° from a horizontal plane), or the horizontal direction.

The animal sensor 116 may be configured to sense a wide variety of different triggering actions. Any one or more actions that a pet, such as a dog, cat, etc., can be trained to perform can be sensed by the animal sensor. Examples of triggering actions that can be sensed by the animal sensor include, but are not limited to, placing the pets snout in an opening, pawing at the apparatus or touching the apparatus, licking the apparatus, making a noise at the apparatus, such as "barking" or "meowing" at the apparatus, etc. In an exemplary sensor embodiment, the animal sensor 116 or triggering arrangement is configured such that only a willful or intentional action by the animal to trigger the apparatus will in fact trigger the apparatus. That is, the triggering arrangement may be configured not to be activated by the mere presence of the animal. Rather, the triggering arrangement is configured to activate when some affirmative and/or learned intentional action is performed by the animal.

The animal sensor 116 can be any arrangement of one or more sensors that are configured to facilitate detection of the triggering action by the pet. Examples of sensors that may be used, include, but are not limited to, switches, touch plate type sensors, beam type sensor, any electric sensor, any optical sensor, any mechanical sensor, etc.

The food handler 108 may take a wide variety of different forms. Any arrangement capable of launching the portion 114 of the animal food away from the animal may be used. For example, the food handler 108 may comprise any type of actuator that moves from a first or "home" position to a second or "launch" position, where movement from the home position to the launch position causes a portion of food to be launched or propelled away from the food handler 108. The food handler may comprise an electromechanical device that launches a portion of food. The food handler 108 preferably launches the pet food a minimum of several feet away from the unit, e.g., at least five feet or at least ten feet from the unit, to provide some activity as the pet chases the launched pet food (as compared with merely dropping the food). A few examples of food handlers 108 capable of launching the food portions 114 include (a) a motor-driven paddle controlled by the control unit 112, (b) a motor driven "whip" (i.e., a motor-driven flexible piece of material) controlled by the control unit, (c) a spring-driven paddle in which the spring is tensioned (e.g., by an electric motor or manually by the user) and the paddle is released to strike and launch the food (e.g., released by a motor-driven release and/or released by an actuator under control of the control unit), (d) a spring-driven "whip" (i.e., a spring-driven flexible piece of material) in which the spring is tensioned (e.g., by an electric motor or manually by the user) and the whip is released to strike and launch the food (e.g., released by a motor-driven release and/or released by an actuator under control of the control unit), etc.

The control unit 112 can take a wide variety of different forms. The control unit 112 may be an electrical controller, such as a microcontroller and/or a circuit board with discrete components, in one embodiment. In another embodiment, the control unit 112 may be a series of mechanical linkages that transfers motion applied by the animal to the sensor 116 to the food handler 108. Any arrangement that communicates the triggering action from the animal sensor 112 to the food handler 108 can be used.

When an electrical controller is used, various control schemes may be implemented. For example, the controller may be configured to determine the amount of distance the animal has covered by pursuing the food portions and prevent operation of the apparatus for a period of time (i.e. provide a break) after a predetermined distance has been spanned by the animal to avoid overexertion of the animal. Further, the control unit 112 may cause the food handler 108 to launch one portion 114 of pet food responsive to one triggering action, the control unit may cause the food handler to launch a predetermined number of pet food portions responsive to one triggering action (either simultaneously or with predetermined pauses between each launch), control unit may cause the food handler to launch a random number of pet food portions responsive to one triggering action, the control unit may cause the food handler to launch a selectable number of pet food portions responsive to one triggering action, etc. Any one or more control scheme may be implemented. In one embodiment, the controller 112 has a user input that allows the owner to select one or more pre-programmed control schemes and/or allow the owner to create an individualized control scheme for the pet.

The controller 112 may also be configured to control the amount of exercise performed by the animal. For example, the controller may control the apparatus to control the distance the animal runs or walks to retrieve its food. This distance may be controlled, such that the animal gets enough exercise, but is not overexerted. This can be accomplished in a variety of different ways. For example, the controller may be set to launch a predetermined number of portions a significant distance away from the apparatus 100. And then, after the appropriate exercise has been performed or distance has been traveled by the animal, the controller may cause the remainder of the animal's food to be launched a shorter distance or provided just outside apparatus. Another way the distance or exercise can be controlled is by controlling the size of the portions. The controller may set the portion size that is launched by the apparatus based on the desired amount of exercise or distance to be traveled by the animal. For example, a user may input a desired distance that the animal should travel for the feeding. The controller can determine the number of launches that correspond to this distance. Then the controller may control the apparatus to divide the animals food into this number of launches or the controller may control the apparatus perform the determined number of launches and then deposit the remainder of the animals meal near the apparatus.

The apparatus 100 may be a stand-alone unit. In the alternative, exemplary systems may have other components in addition to the components described with respect to FIG. 1, or the components of the apparatus illustrated by FIG. 1 may be discrete and spaced apart, depending on the particular application of the apparatus.

FIG. 2 illustrates another embodiment of and apparatus 200 for automatically projecting pet food pieces in response to a triggering action by a pet. The illustrated apparatus 200 includes all of the components of the apparatus 100 and further comprises a food portioner 202. The food portioner 202 is arranged to receive the animal food from the food hopper 104 and automatically portions or rations the food and transfers the portions to the food handler 108. The food portioner 202 may take a wide variety of different forms. Any arrangement that divides the food from the hopper 104 into portions or rations and transfers the portions or rations from the hopper 104 to the food handler may be used. Examples of food portioners 202 include, but are not limited to, (a) a motor-driven separator that lifts one or more pieces of food to be launched by the food handler, (b) a solenoid that strikes food pieces from below to cause them to lift over a barrier and to the food handler, with the barrier preventing the remaining food from entering the handler, (c) separators that separate food pieces from beneath by using a covered, opening that is controlled to drop a portion of food through the opening (such as those found in so-called bubble gum machines), etc.

FIG. 3 illustrates another embodiment of an apparatus 300 for automatically projecting pet food pieces in response to a triggering action by a pet. The illustrated apparatus 300 includes all of the components of the apparatus 200 and further comprises a food detector 302. The food detector 302 is operatively connected to the food portioner 202 and/or the food handler 108 to detect that one or more portions of food have been successfully transferred by the food portioner to the food handler. A food detector may also be included to detect an amount of food remaining in the hopper 104 and/or to detect whether food is remaining in the hopper. The food detector 302 may take a wide variety of different forms. Any sensor capable of detecting the presence of a food portion may be used. For example, the food detector may be a pressure sensor, a switch, an optical sensor, etc. The food detector 302 may be arranged to confirming that a food portion is available to be launched (or has been launched). Examples of food detectors 302 include, but are not limited to, (a) an sensor (such as an LED and detector pair or a touch sensor) in circuit communication with the control unit and/or a physical structure that permits or prevents a certain movement (such as actuation of the food launcher) unless a piece of food is contacted by the structure. The food detector(s) can be positioned in any of a number of locations, e.g., positioned to detect that a portion of food is in a desired position, such as in a pre-launch position, or a ready-to-launch position, or positioned to detect that a portion of food has passed through a desired conduit, such as an internal conduit (e.g., confirming that a food portion has passed from one stage to another) or a conduit leading outside the unit (e.g., confirming that a food portion has been projected out an opening to outside the unit).

In an exemplary embodiment, the control unit 112, the food detector 302, food portioner 202 and/or the food handler 108 cooperate to ensure that a portion 114 of animal food is launched in response to detection of a triggering action of the animal. The control unit 112, the food detector 302, food portioner 202 and/or the food handler 108 perform the following functions: (1) separate a portion of food provided by the hopper, (2) confirm that a food portion is available to be launched (or has been launched), and (3) launch the portion of food. In addition, the food handler 108 and/or the food portioner 202 may also perform the function of agitating the bulk pellet supply provided by the hopper to assure steady flow of food pieces to a food separator or food launcher. Although a food detector 302 is optional, and in embodiments without the food detector the confirmation function is not performed, this is not preferred because of the potential of various undesirable effects on the pet—such as frustration and perhaps detraining—when the pet properly actuates the unit and no food is launched in response thereto.

FIG. 4 illustrates another embodiment of an apparatus 400 for automatically projecting pet food pieces in response to a triggering action by a pet. The illustrated apparatus 400 includes all of the components of the apparatus 300 and further comprises a food portion availability signaling arrangement 402. The food portion availability signaling arrangement 402 provides an indication to the animal that a food portion is available for launching by the food handler 108. The food portion availability signaling arrangement 402 may take a wide variety of different forms. For example, the food portion availability signaling arrangement 402 may comprise a sound producing device, a light or image emitting device, and/or a control unit may operate one or more of the components of the device to cause a sound (for example a stirring of the food sound) and/or a scent to be emitted (opening a vent or door of the device that is in communication with the food) and/or that causes the device to move or vibrate. The signal provided may be any signal that is detectable by the animal using the device. In one embodiment, the signal is detectable by the animal and is not detectable (or not easily detected) by humans.

The apparatus 400 for projecting pet food portions may be configured to attract the animal to the sensor 116 to eliminate or reduce training of the animal. Exemplary embodiments may use any one or a combination of any two or more of the following to attract the animal to the switch/sensor without any intervention from a human: having food scent emanate from or proximate the location of the switch/sensor, presenting attracting sounds via a speaker (such as scratching sounds generated by the control unit and played via a speaker) proximate the switch/sensor, producing a glint of light visible proximate the switch/sensor (e.g., generating light around the edges of the switch/sensor), and/or otherwise luring the animal to the switch/sensor (e.g., by exploiting the animal's natural reactions to any one or more of sight, sound, and/or scent, etc. to attract the animal to the switch/sensor). In the alternative, or in addition thereto, ordinary training methods may be used to train the animal to actuate the trigger for self-feeding.

FIGS. 5 and 6 illustrate embodiments of apparatus 500 and 600 that include communication circuits 124 in communication with a control unit 112. The apparatus 500 and 600 may be constructed in accordance with any one or more of the embodiments described in this application with the addition of the communications circuit 124. The control unit 112 may be a processor (e.g., a microcontroller with integral memory) preprogrammed to perform any one or more of the functions described herein or a simple electronic state machine (e.g., a plurality of flip-flops or other bi-stable circuit elements) configured to perform any one or more of the functions described herein. The control unit 112 may be preprogrammed to gather and store in memory any combination or permutation of various data pertaining to the use of the unit by the pet. The communications circuit 124 may be any one or more wired or wireless controllers, implementing any of the well known serial and/or parallel communications protocols, such as Bluetooth, Wi-Fi, USB, USB 2, FireWire, etc. for communication with another computer system 130, such as a remote computer system. The control unit 112 may be preprogrammed to download data about use of the unit stored in the memory (e.g., duration and frequency of usage by the pet) to the other computer 130 via the communications circuit 124. The other computer system 130 may be programmed to analyze and/or display data about use of the unit downloaded from the pet feeder.

As shown in FIG. 6, an exemplary system 600 may comprise such a unit having a modified control unit 112 that is controllable via the Internet 602, with a user being able to manually trigger the food handler 108 to launch a portion of food via a command transmitted over the Internet via a user interface at a remote computer 332. Additionally, or in the alternative, the system 600 can be configured to permit the user to modify system parameters in the control unit 112, e.g., the number of food portions launched per triggering action, over the Internet 602 via a user interface at a remote computer 332. The control unit 112 or a local computer 330 may have any one or more of the following to permit a user to interact with a pet in connection with the unit 600 via a remote computer, e.g., over the Internet 602: a speaker 604 proximate and/or integral with the unit to transmit sounds from the user to the pet, a microphone 606 proximate and/or integral with the unit to transmit sounds from the pet to the user, a camera 608 proximate and/or integral with the unit to transmit still images of the pet to the user, and/or a video camera 610 proximate and/or integral with the unit to transmit video images of the pet to the user.

One uses the apparatus for projecting pet food portions by adding food to the hopper 104 (e.g., the pet's daily allotment of food or half of the pet's daily allotment of food or some other amount of food) and activating the apparatus (e.g. via the control unit 112). The hopper may be sized to hold virtually any suitable amount of food, such as enough food for one day or enough food for multiple days or even weeks. Regardless of the amount of food held by the hopper 104, the unit may be configured to require actuation for each feeding or may be configured to automatically activate at preset times or periodically. Portions of food provided to the animal are controlled by the number of cycles, etc. As an example, the hopper may be sized to hold roughly a week's food supply for a large (~100-pound) dog. In the alternative, the unit need not have an attached hopper, and a portion of the unit may be configured to accept a separate hopper or be coupled to a separate hopper, such as a hopper consisting of or comprising a prepackaged, disposable food container. For example, the hopper may consist of or comprise a cardboard food container, and the user may cut an opening in a surface of the container and position the cut opening in the hopper over the unit, which unit holds the food container and accepts food from the separate hopper to be launched by the food handler 108.

FIGS. 7A-13G illustrate an exemplary embodiment of an apparatus 700 that automatically project pet food pieces or portions 114 in response to a triggering action by a pet. Any combination or sub-combination of features of the embodiments of FIGS. 1-6 may be included in the apparatus 700 and/or any combination or sub-combination of features of the apparatus 700 may be included in any of the embodiments of FIGS. 1-6.

Figure 7B:
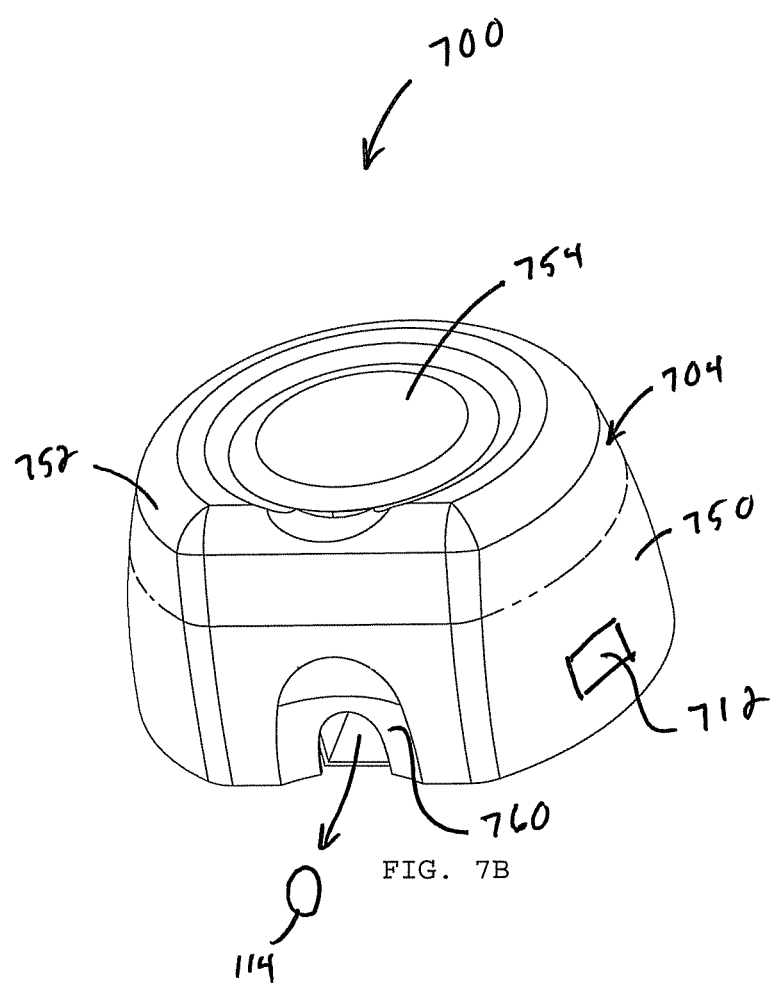
FIG. 7B is a perspective view of the apparatus of FIG. 7A showing an opposite side of the apparatus.
Figure 7C:
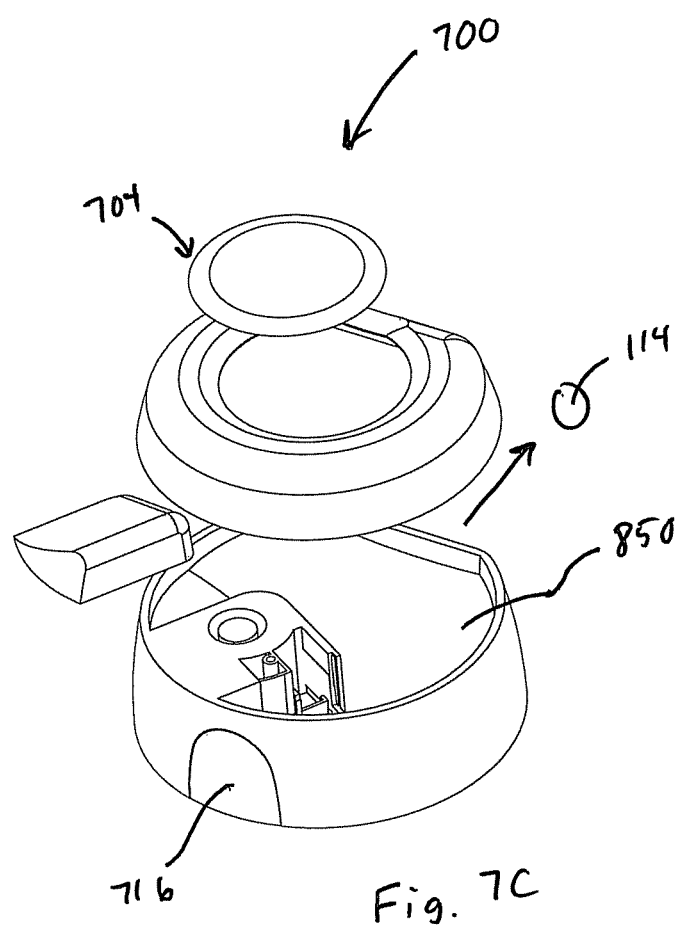
FIG. 7C is an exploded perspective view of the apparatus of FIG. 7A with cover components separated from a remainder of the apparatus.

The illustrated apparatus 700 includes a food hopper 704 see FIGS. 7A-7C), a food portioner 802 (see FIGS. 9B and 10B), food detector 902 (see FIG. 9C), a food handler 708 (see FIG. 9A), a control unit 712 (illustrated schematically in FIGS. 7A and 7B), and an animal sensor 716 (see FIG. 7A). In the example illustrated by FIGS. 7A-13G the food hopper 704, the food portioner 802, the food detector 902, and/or the food handler 708 include common or integrated parts to reduce the total number of parts that make up the apparatus 700. As such, in the following description, some parts are referred to as being included in more than one of the food hopper 704, the food portioner 802, the food detector 902, and/or the food handler 708.

Figure 8:
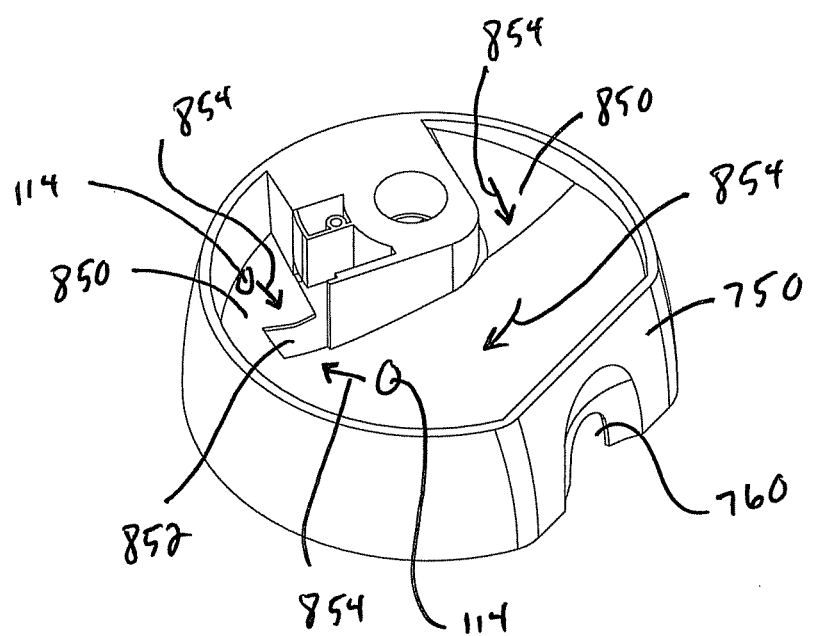
FIG. 8 is a perspective view of a housing of the apparatus of FIG. 7A.

Referring to FIGS. 7A-7C, the food hopper 704 comprises a circular, bowl shaped housing 750, a cover 752 disposed on the housing, and a lid 754 disposed on the cover. Referring to FIG. 8, the bowl shaped housing 750 has sloped internal surfaces 850. The sloped surfaces 850 slope toward a food portioner opening 852 as indicated by arrows 854. As such, food pellets placed in the bowl shaped housing 750 tend to slide or roll into the food portioner opening 852 under the force of gravity. The bowl shaped housing 750 may also be provided with a mechanism for vibrating the bowl shaped housing to encourage movement of the food pellets to the food portioner opening 852.

Referring to FIGS. 7A and 7B, the animal sensor 716 is positioned on one side of the bowl shaped housing 750 (see FIG. 7A) and a food outlet 760 is positioned on an opposite side of the housing (see FIG. 7B). In the embodiment illustrated by FIG. 7A, the animal sensor 716 is a switch having an actuator that is sized to engage the snout of an animal, but any configuration of animal sensor may be employed. The food outlet 760 is sized to allow a portion, such as 1-6 animal food (i.e. cat or dog food) pellets, to exit the bowl shaped housing 750.

Figure 9A:
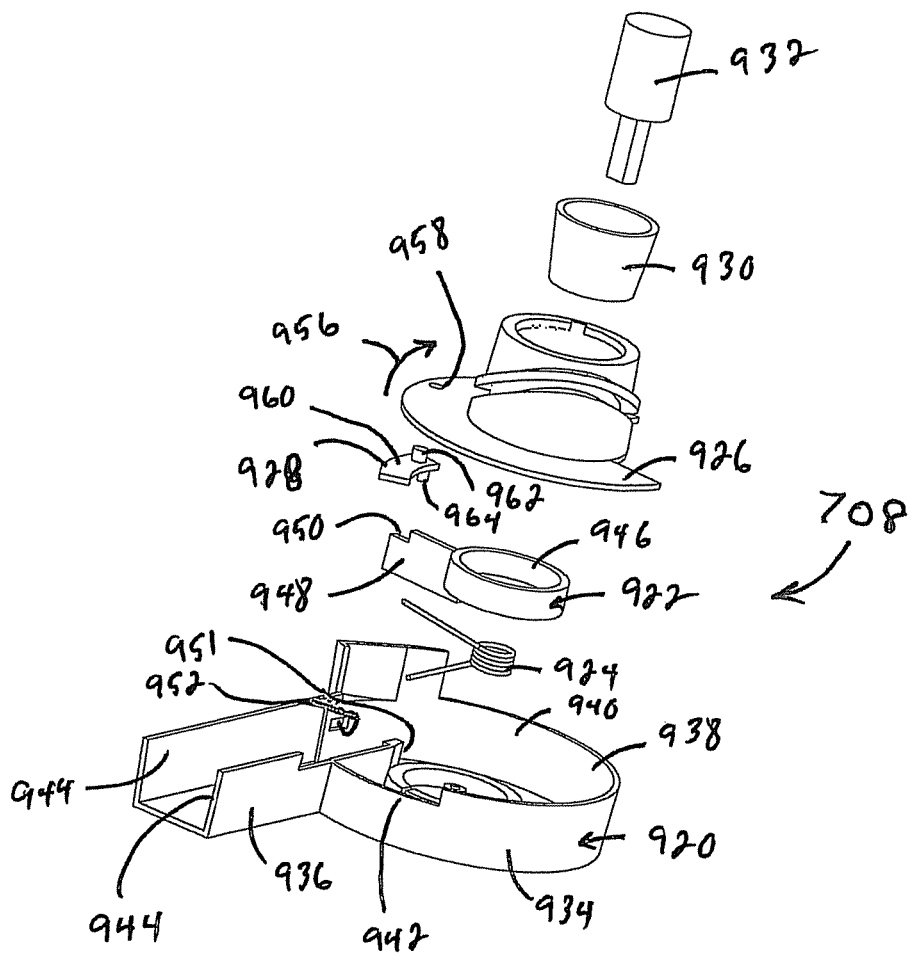
FIG. 9A is an exploded perspective view of parts that form a food handler of the apparatus of FIG. 7A.

FIG. 9A is an exploded perspective view of the parts that form the food handler 708. The parts include a base or track 920, a paddle 922, a torsion spring 924, a drive ring 926, a pivoting drive arm 928, a coupling member 930, and a motor 932. The base or track 920 includes a circular portion 934 and an outlet chute 936. The circular portion 934 includes a wall 938 with an elevated drive portion 940 and a relatively shorter release portion 942. The outlet chute 936 also includes walls 944 for guiding the pellet(s) out of the apparatus 700. The paddle 922 includes a circular inner portion 946 and generally rectangular outer portion 948. A notch 950 is defined in the outer portion 948. The paddle 922 is rotatably connected to the track 920. The torsion spring 924 is connected to the paddle 922 and to the track 920 to bias the paddle 922 to a home position (see FIGS. 10F and 10G). A stop 951 sets the home position by engaging the rectangular portion 948. A sensor 952, such as a switch, may be positioned on the track 920 to detect whether the paddle 922 at the home position. (See FIGS. 10G and 10F).

The illustrated drive ring 926 is integrally formed with or fixed for rotation with an annular cam 954. The drive ring 926 is rotatably connected to the track 920, concentrically with the paddle 922. The motor 932 is coupled to the drive ring 926 by the coupler 930. The motor 932 rotates the drive ring 926 in the direction indicated by arrow 956. The drive ring 926 includes a pivot hole 958.

The illustrated pivoting drive arm 928 includes a follower portion 960, a pivot post 962 that extends from one side of the follower portion, and a drive post 964 that extends from the other side of the follower portion. The pivot post is rotatably connected to the pivot hole 958 of the drive ring 926. When the follower portion is disposed along the elevated drive portion 940 of the wall 938, the drive post 964 is forced radially inward of the notch 950 of the paddle 922, such that the drive post 964 drives the paddle 922 (see FIGS. 10F, 10G, 11F, 11G, 12F and 12G). When the follower portion is disposed along the shorter release portion 942 of the wall 938, the drive post 964 is allowed to move radially outward of the notch 950 of the paddle 922, such that the drive post 964 disengages the paddle 922 (see FIGS. 13F and 13G). As such, the drive arm 928 drives the paddle 922 to compress the torsion spring 924, as the drive arm is moved from the home position along elevated drive portion 940 of the wall 938. When the drive arm 928 reaches the shorter release portion 942 of the wall 938, drive arm disengages the paddle 922 and the torsion spring 924 quickly returns the paddle 922 to the home position as indicated by arrows 967 in FIG. 13F.

Figure 9B:
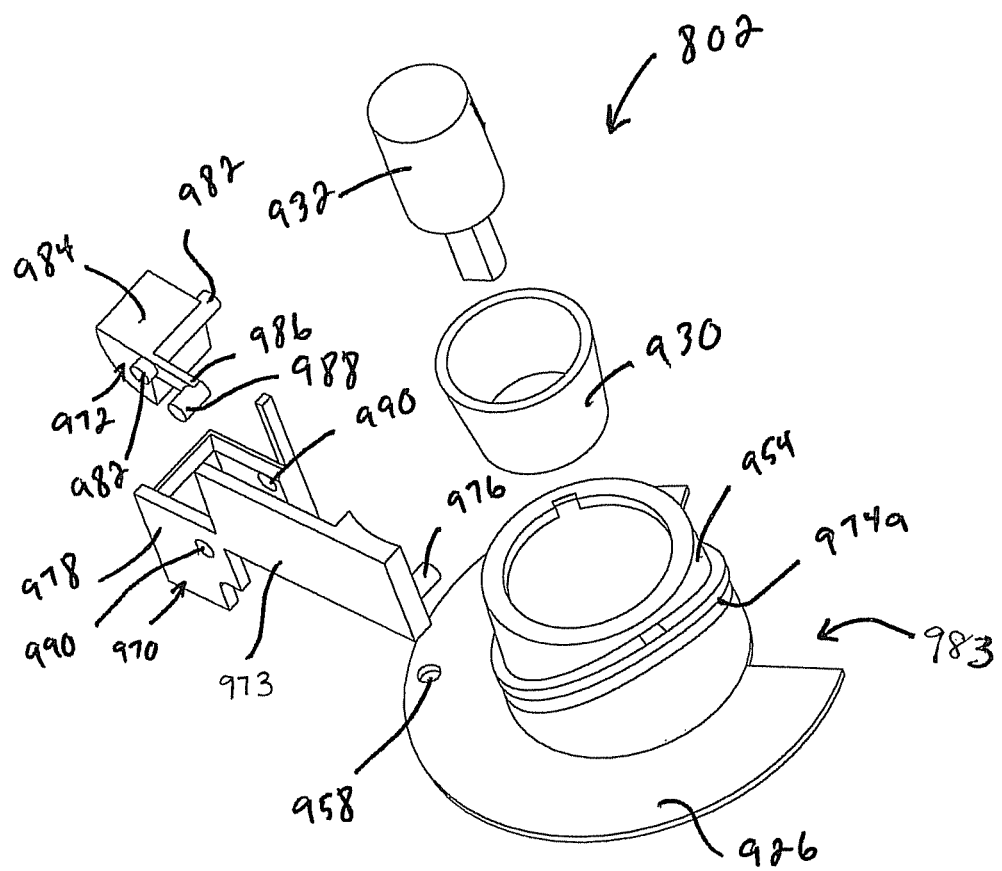
FIG. 9B is an exploded perspective view of parts that form a food portioner of the apparatus of FIG. 7A.

FIG. 9B is an exploded perspective view of the moving parts that form the food portioner 802. The food portioner 802 comprises the annular cam 954 and coupled drive ring 926, a follower 970, an a flipper 972. The annular cam 954 includes a continuous undulating groove 974a. The follower 970 includes arm 974, a pin 976 at one end of the arm, and a pivot bracket 978 at the other end of the arm. The pin 976 is sized to fit in the undulating groove 974 of the annular cam 954. The pivot bracket 978 is sized to fit in the food portioner opening 852 (see FIGS. 10A and 11A). The track 920 includes a barrier wall portion 980 (See FIG. 10 B). The food portioner opening 852 and the barrier wall portion 980 act as a guide for the pivot bracket 978, such that the pivot bracket is moveable between a lower position (see FIGS. 10A and 10B) and a raised position (see FIGS. 11A and 11B). The pin 976 follows the groove 974a to move the follower up and down between the lower and raised positions. As such, the undulating groove 974a defines the up and down motion of the follower.

The flipper 972 includes a pair of pivot protrusions 982, a food engagement portion 984 extending from one side of the food engagement protrusions, and a pivot arm 986 extending from the other side of pivot protrusions. A drive post 988 extends from the pivot arm 986. The pair of pivot protrusions 982 are disposed in holes 990 in the pivot bracket 978 to pivotally connect the flipper 972 to the pivot bracket. A surface of the housing 750 is positioned on or just above the drive post 988. When the pivot bracket 978 is moved from the lower position (see FIGS. 10A and 10B) to the raised position (see FIGS. 11A and 11B), the drive post 988 engages the housing 750, which causes the flipper 972 to pivot.

Figure 10A:
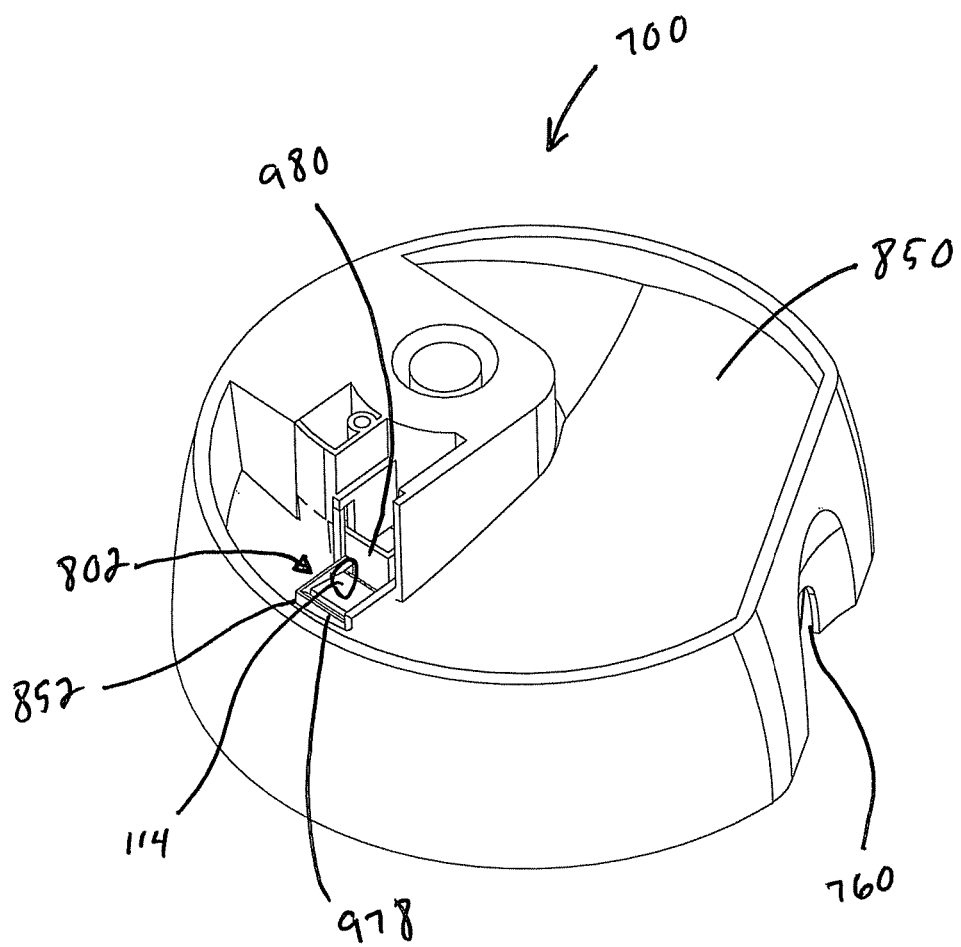
FIG. 10A is a perspective view of parts of the apparatus of FIG. 7A, where the parts are in a home position.
Figure 11A:
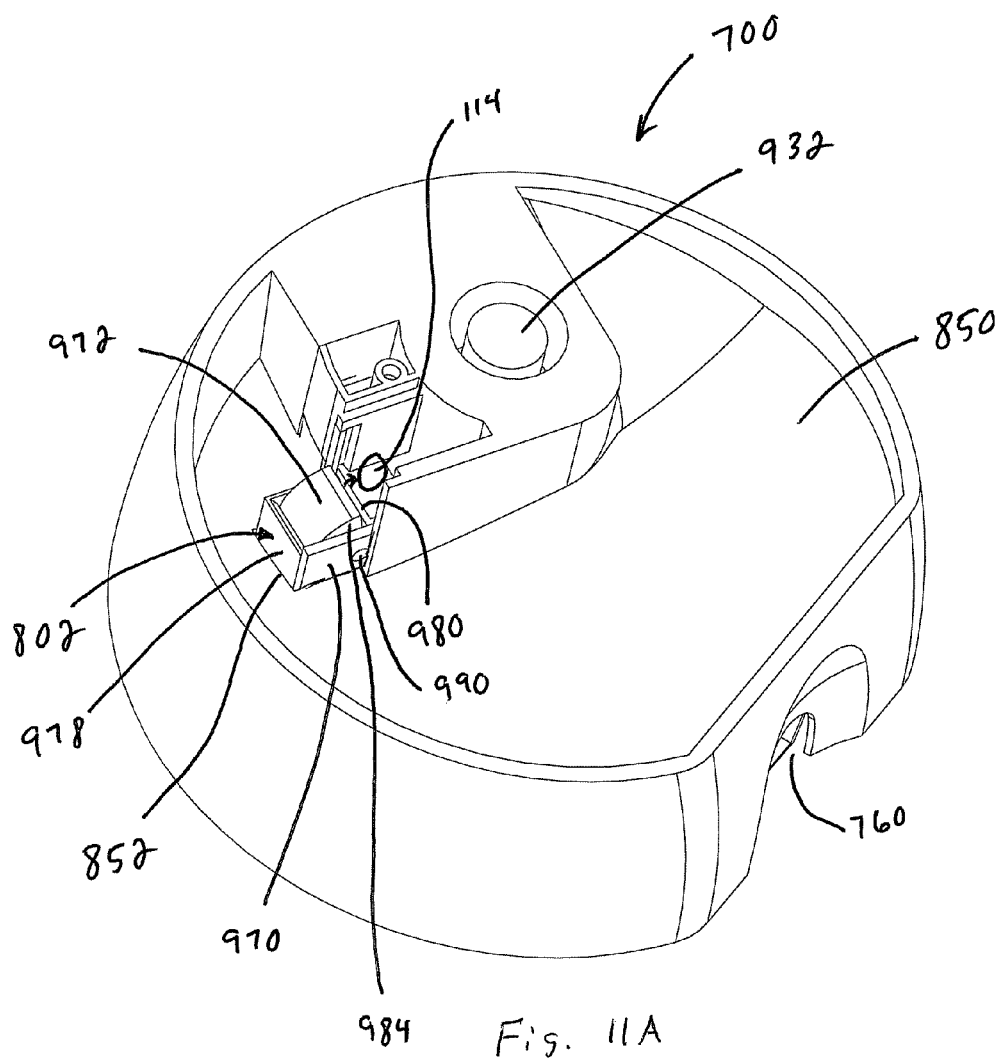
FIG. 11A is a perspective view of parts of the apparatus of FIG. 7A, where a cam and drive ring that control the parts are rotated 90 degrees from the home position.
Figure 11B:
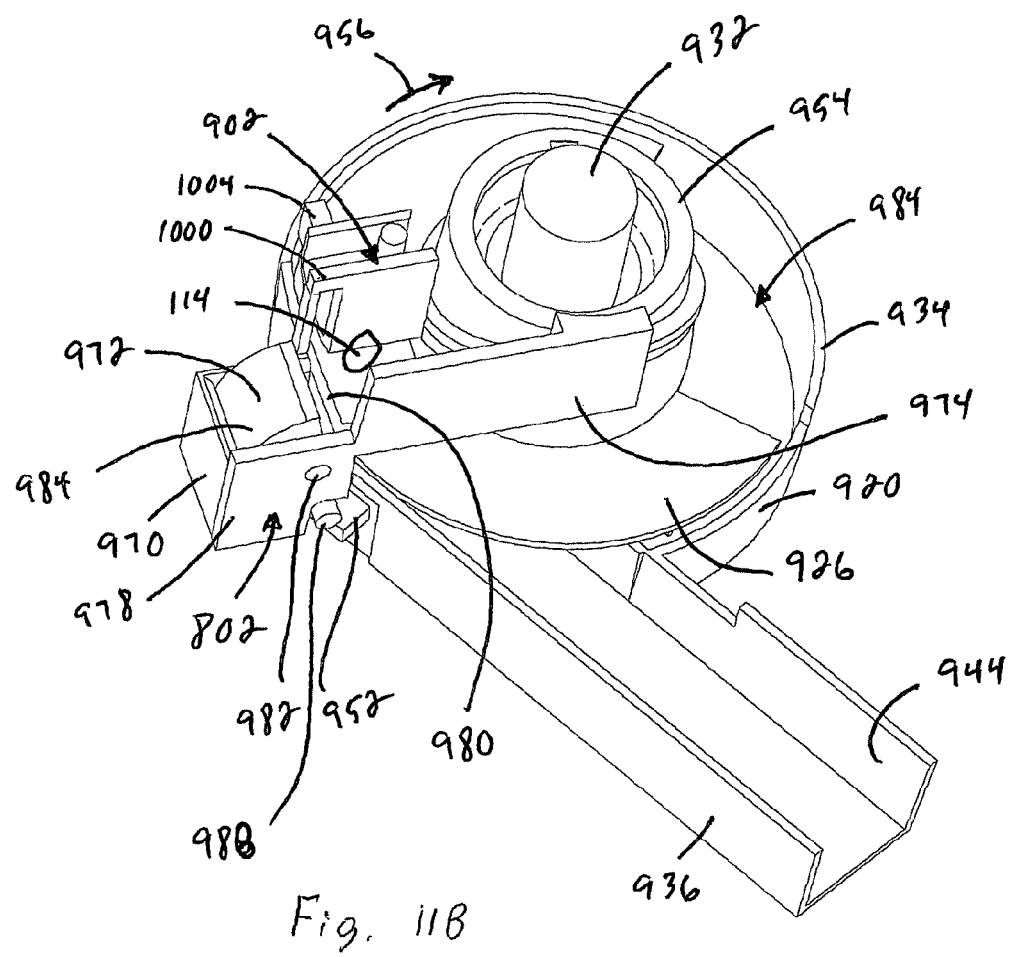
FIG. 11B is a perspective view of parts of a food handler, a food portioner, and a food detector where a cam and drive ring that control the parts are rotated 90 degrees from the home position.
Figure 11C:
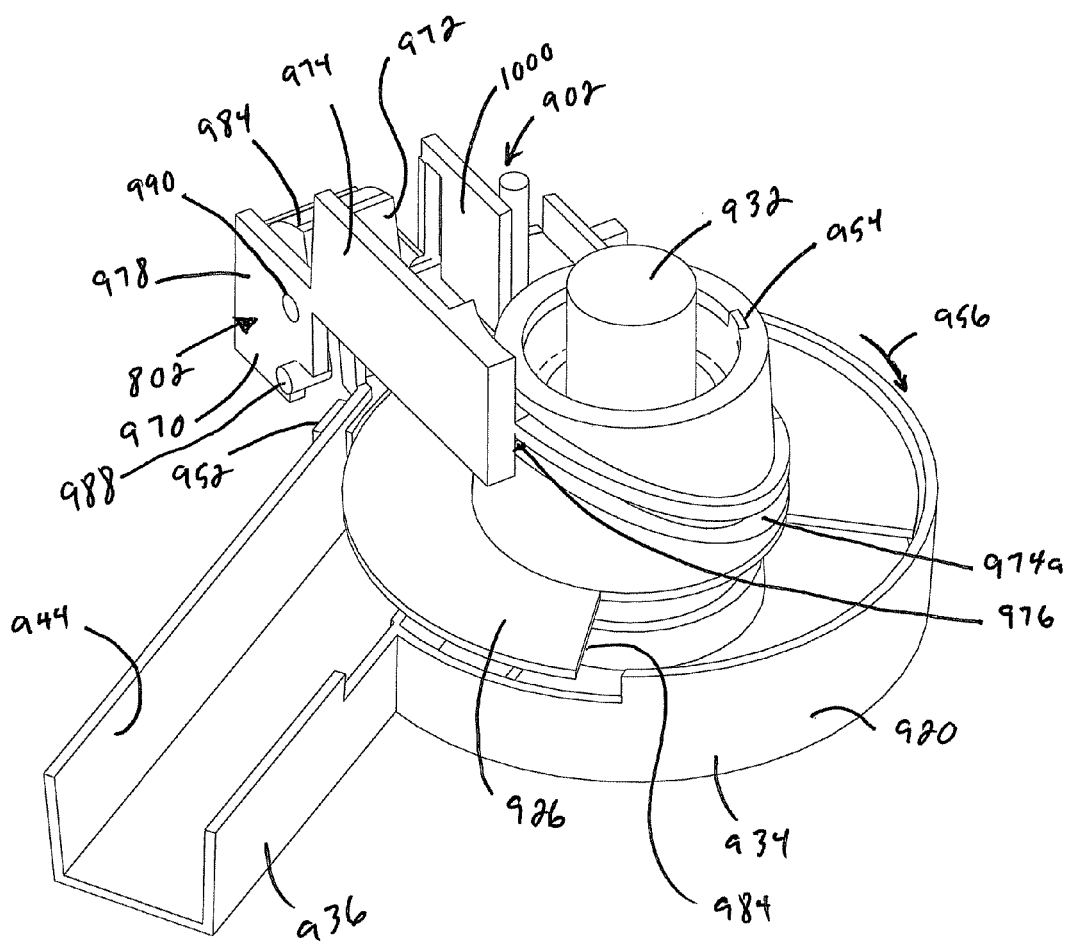
FIG. 11C is a perspective view of parts of a food handler, a food portioner, and a food detector where a cam and drive ring that control the parts are rotated 90 degrees from the home position.
Figure 11D:
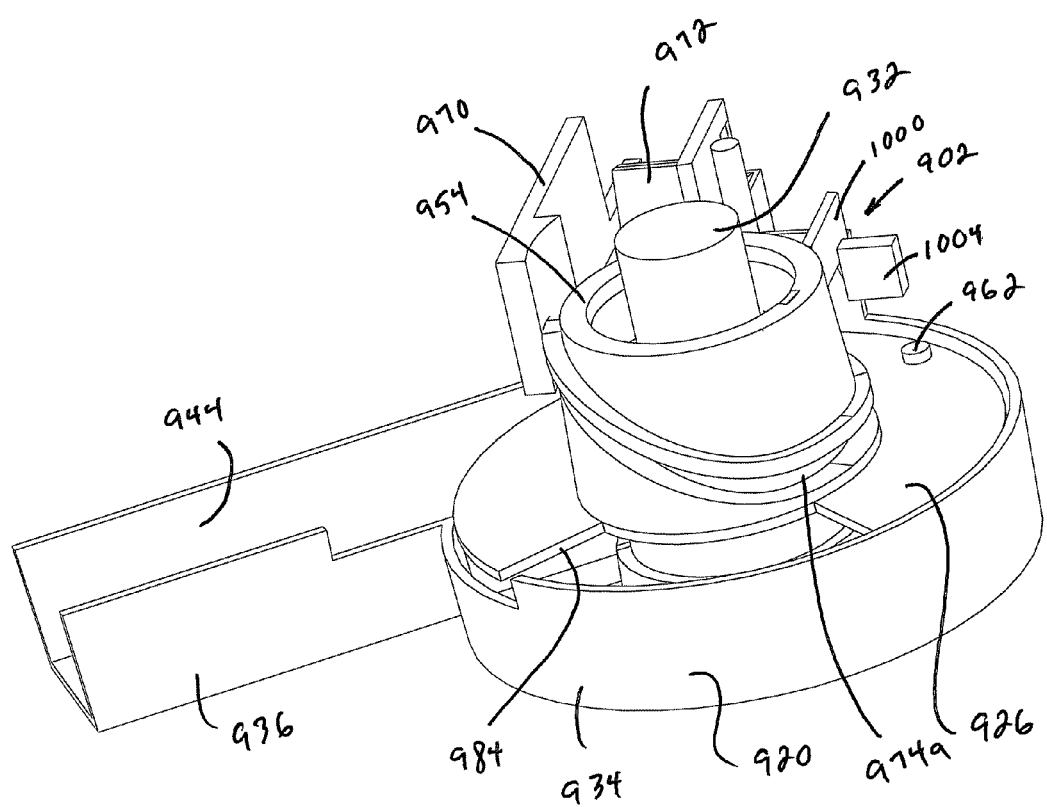
FIG. 11D is a perspective view of parts of a food handler, a food portioner, and a food detector where a cam and drive ring that control the parts are rotated 90 degrees from the home position.
Figure 11E:
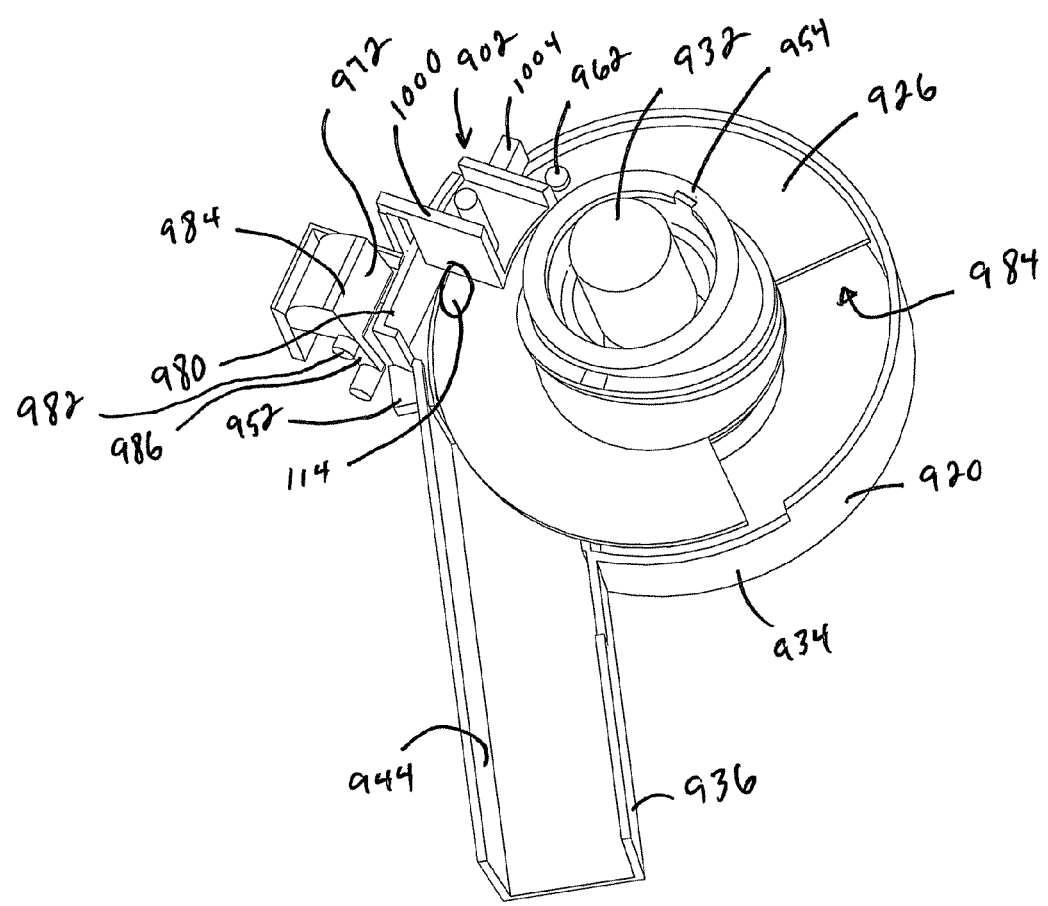
FIG. 11E is a perspective view of parts of a food handler, a food portioner, and a food detector where a cam and drive ring that control the parts are rotated 90 degrees from the home position.

Referring to FIG. 10A, the follower 970 is in the lower position, the food in the bowl shaped housing 750 slides down the sloped internal surfaces 850 and onto the pivot bracket 978 and flipper 972. Referring to FIGS. 11A and 11B, when the follower 970 is moved to the raised position, the pivot bracket 978 moves up and the flipper 972 pivots, such that the food engagement portion 984 flips a food portion 114 (for example 1-6 pellets of pet food) over the barrier wall portion 980 of the track 920. Referring to FIG. 11B. the food portion lands on the drive ring 926. The general position of the food portion with respect to the track 920 is maintained by the food detector 902 as will be described in more detail below. If a food detector 902 is not included, the general position of the food portion with respect to the track 920 can be maintained by a fixed wall in the position of the food detector.

The drive ring 926 includes a cutout 984. The food portion will remain on the drive ring 926, until the drive ring 926 rotates such that the cutout 984 moves below the food portion (see FIG. 12E). When the cutout 984 is below the food portion, the food portion falls into the track 920. When the paddle 922 is released, the paddle 922 engages the food portion in the track 920 to propel the food portion along the chute 936, and out the food outlet 760. Since the food portioner 802 and the food handler are both driven by the motor 932 and the same annular cam 954, their relative movements are automatically coordinated.

Figure 9C:
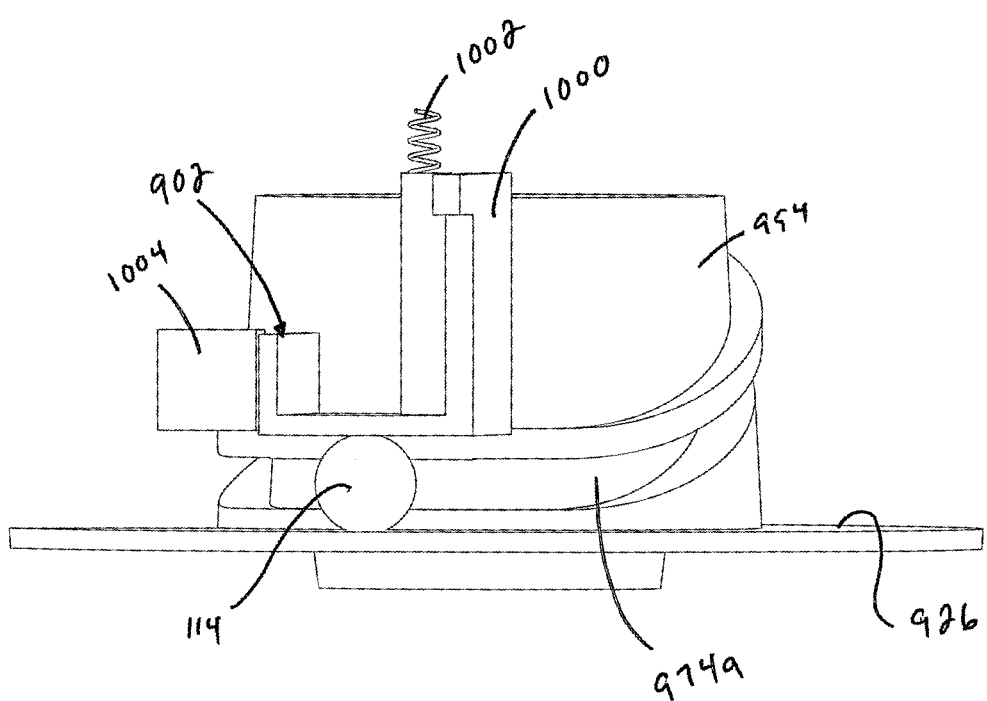
FIG. 9C is a perspective view that illustrates parts that form a food detector of the apparatus of FIG. 7A.
Figure 9D:
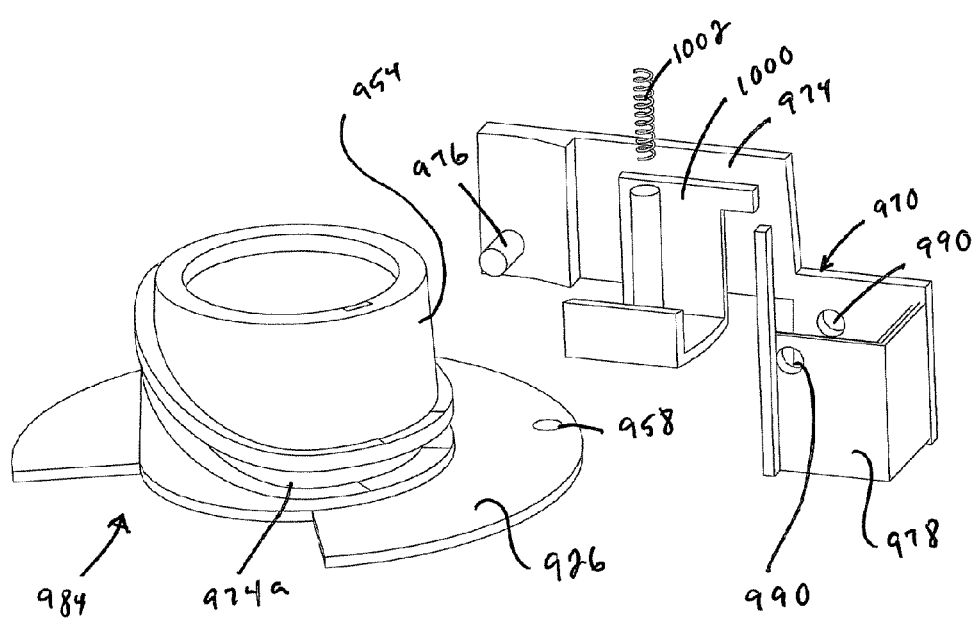
FIG. 9D is a perspective view that illustrates parts of a food portioner and a food detector of the apparatus of FIG. 7A.
Figure 10B:
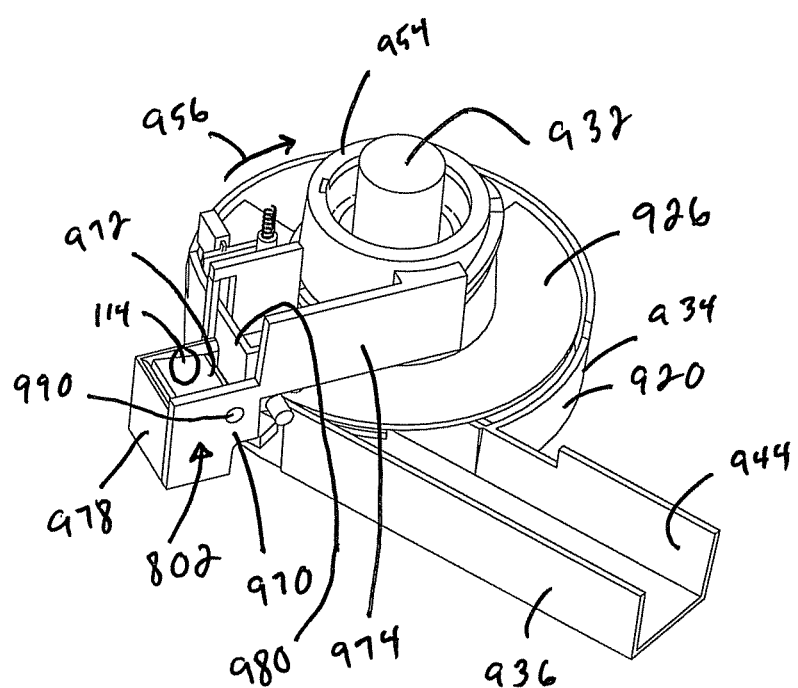
FIG. 10B is a perspective view of parts of a food handler, a food portioner, and a food detector where the parts are in a home position.

FIG. 9C is a perspective view that illustrates the parts that form the food detector 902 and the positioning of the food detector with respect to the annular cam 954 and drive ring 926. The illustrated food detector 902 comprises an engagement member 1000, a biasing member 1002, such as a spring, that biases the engagement member 1000 toward the drive ring 926, and a sensor 1004, such as a switch, positioned to detect the position of the engagement member. Referring to FIGS. 10B and 11B, the engagement member 1000 is configured to be moved upward by upward movement of the follower 970 against the biasing force of the spring 1002. As such, as long as there is nothing between the engagement member 1000 and the drive ring 926, the engagement member 1000 will follow the motion of the follower 970. However, when the follower is moved to the raised position (see FIG. 11B), a food particle 114 will be moved onto the drive ring as described above. In the raised position, the engagement member 1000 is spaced apart from the drive ring 926 and rotation of the drive ring places the food portion beneath the engagement member (see FIG. 9C). When the food portion is beneath the engagement member 1000, the engagement member will remain in an elevated position, when the follower 970 returns to the lower position. The engagement member 1000 tends to maintain the position of the food portion, as the drive ring 926 slides underneath the food portion. The sensor 1004 and/or the control unit 712 are is configured to detect that the engagement member is in the raised position while the follower is in the lowered position, which is an indication that a food portion has been successfully transferred from the food hopper 704 to the food handler 708.

Operation of the Apparatus 700

Figure 10C:
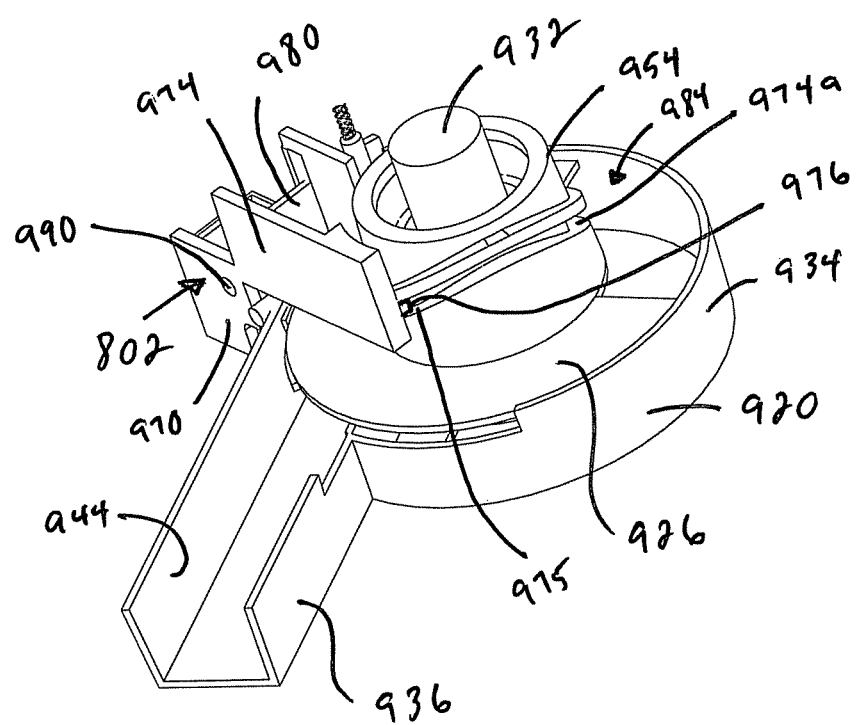
FIG. 10C is a perspective view of parts of a food handler, a food portioner, and a food detector where the parts are in a home position.
Figure 10:
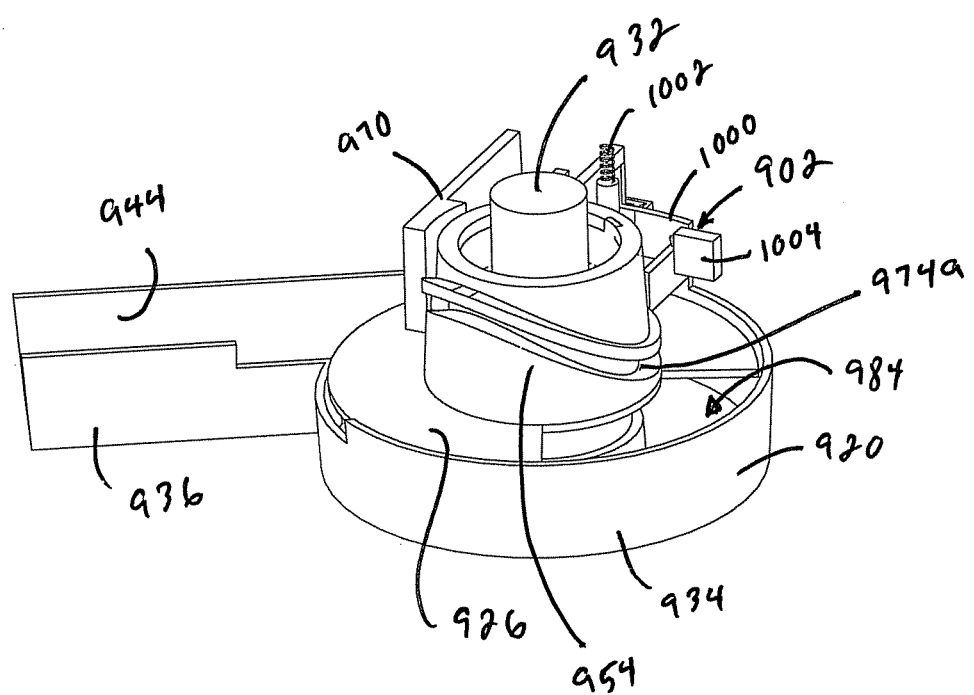
FIG. 10D is a perspective view of parts of a food handler, a food portioner, and a food detector where the parts are in a home position.
FIG. 10E is a perspective view of parts of a food handler, a food portioner, and a food detector where the parts are in a home position.
FIG. 10F is a perspective view of parts of a food handler, a food portioner, and a food detector where the parts are in a home position.
FIG. 10G is a perspective view an underside of parts of a food handler and a food portioner where the parts are in a home position.
Figure 10E:
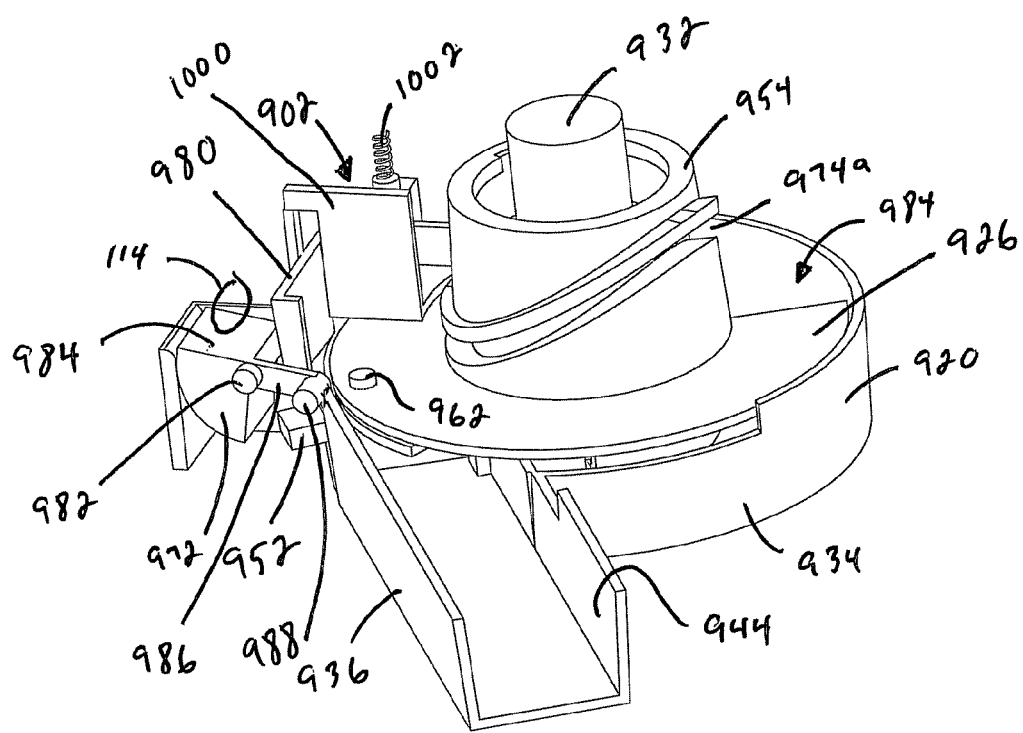
Figure 10F:
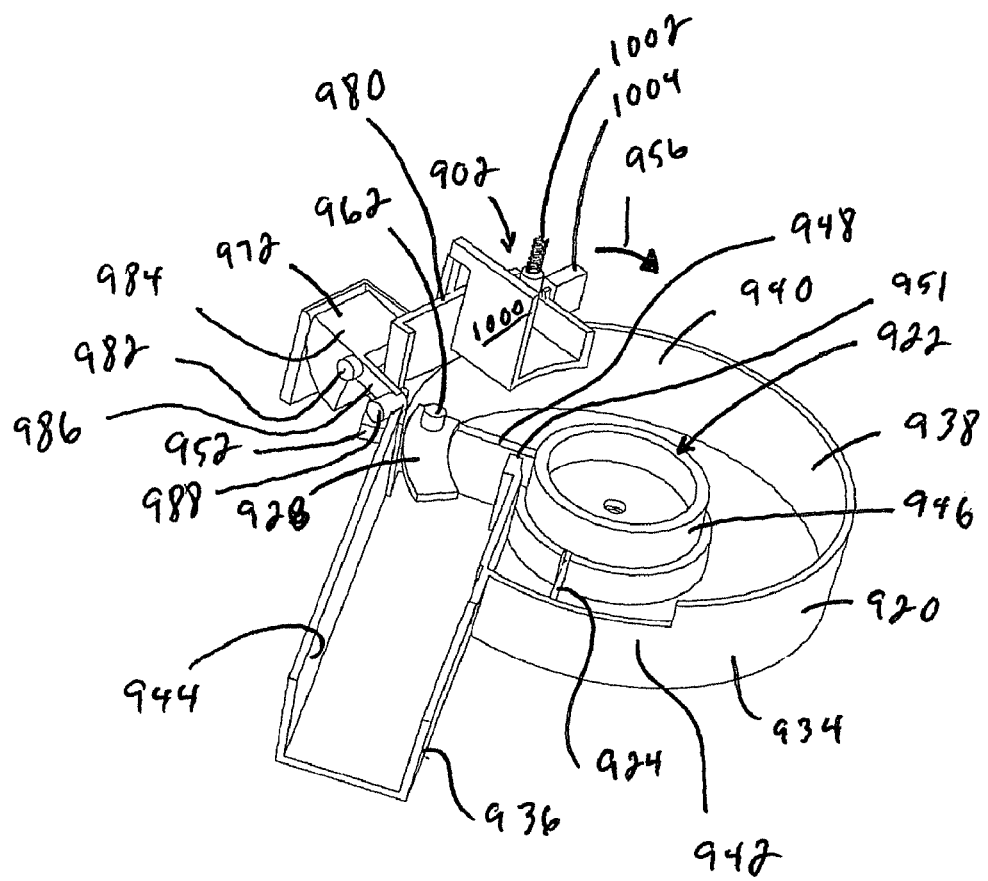
Figure 10G:
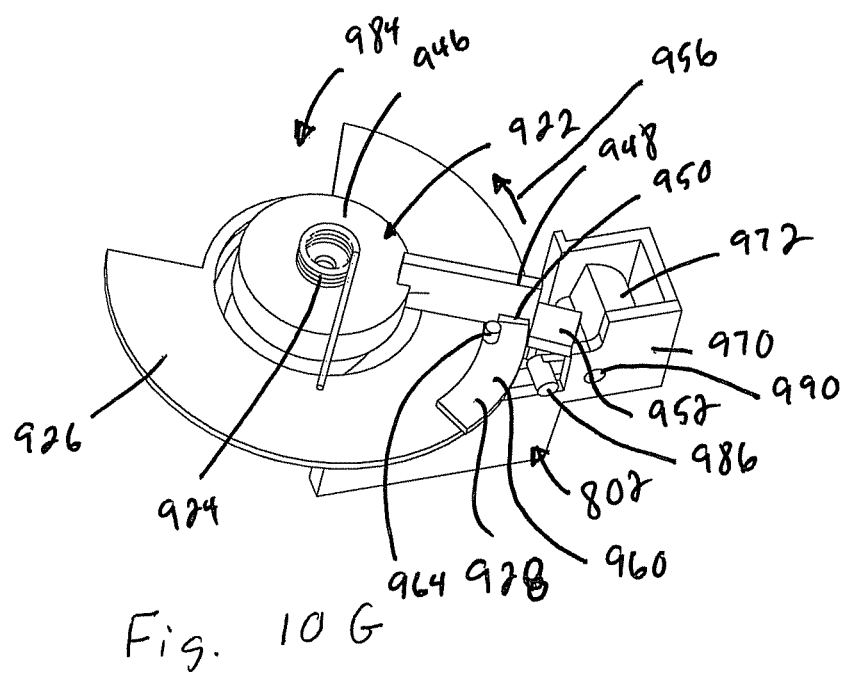

The apparatus 700 is activated by the animal touching or otherwise activating the animal sensor 716 (FIG. 7A) to initiate a cycle. FIGS. 10A-10G illustrate the components of the apparatus 700 in a home position. Typically, components of the apparatus 700 will be at the home position at the time the animal sensor 716 is activated. Referring to FIG. 10A, at the home position, the follower 970 and flipper 972 are at the lowest point. The pivot bracket 978 and the flipper 972 are aligned with or below the bottom of the sloped internal surfaces 850, such that a food portion 114 (for example 1-6 food pellets) fall onto the flipper 972 under the force of gravity. Referring to FIG. 10C, the pin 976 of the follower 970 is disposed in the bottom-most portion of the undulating groove 974, just before an inclined portion 975 of the undulating groove begins. The arm 974 may be disposed on, or just above, the drive ring 926. Referring to FIG. 10E, the engagement member 1000 of the food detector will also be biased to the lowest position, assuming no food is disposed between the engagement member 100 and the drive ring 926. Referring to FIG. 10G, the sensor 952 detects that the paddle 922 is at the home position. The sensing can be processed by the controller to verify that the food handler 908 is not jammed. Referring to FIGS. 10F and 10G, at the home position, the torsion spring 924 is not compressed. The pivoting drive arm 928 may not yet engage the track 920 or may just start to engage the track. The drive post 964 may be spaced apart from the paddle 922, or may just start to touch the paddle.

Figure 11F:
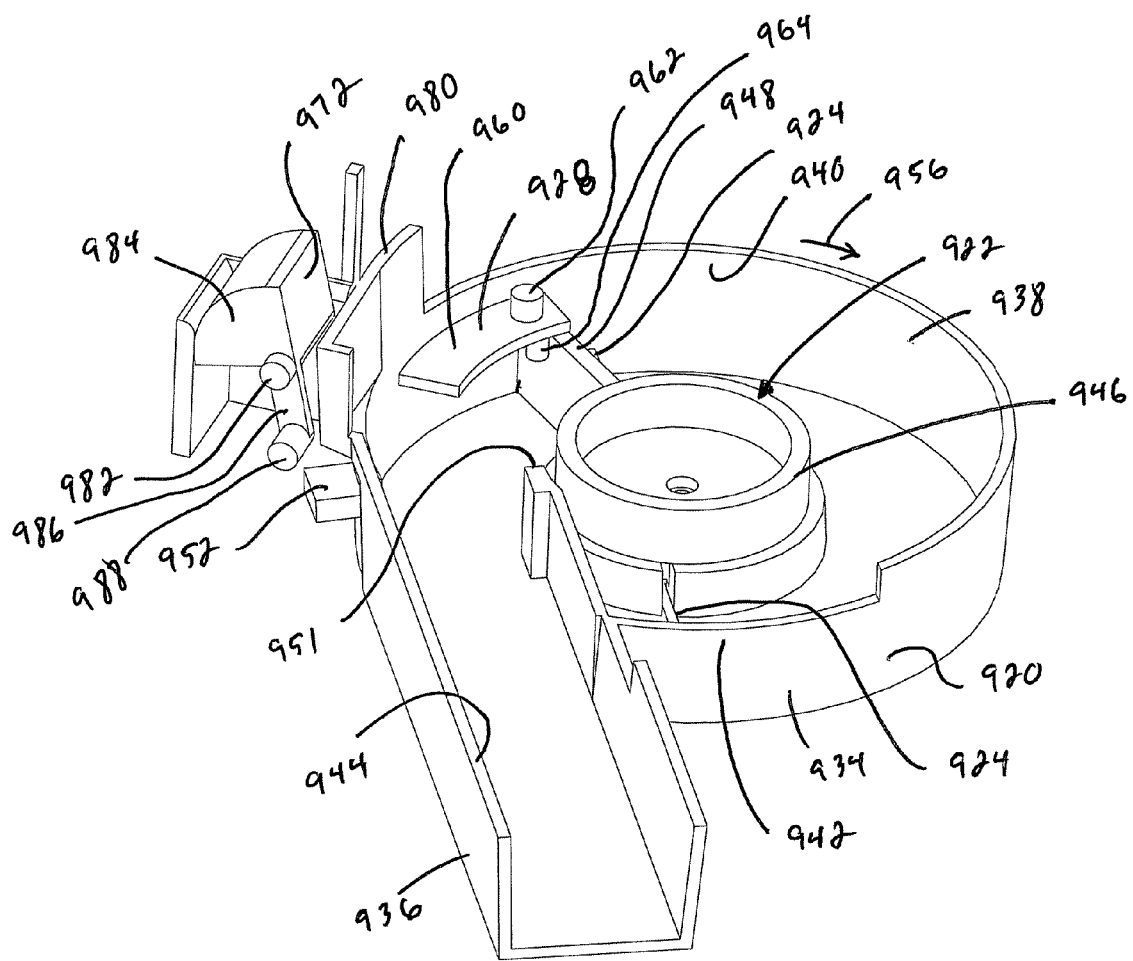
FIG. 11F is a perspective view of parts of a food handler, a food portioner, and a food detector where a cam and drive ring that control the parts are rotated 90 degrees from the home position.
Figure 11G:
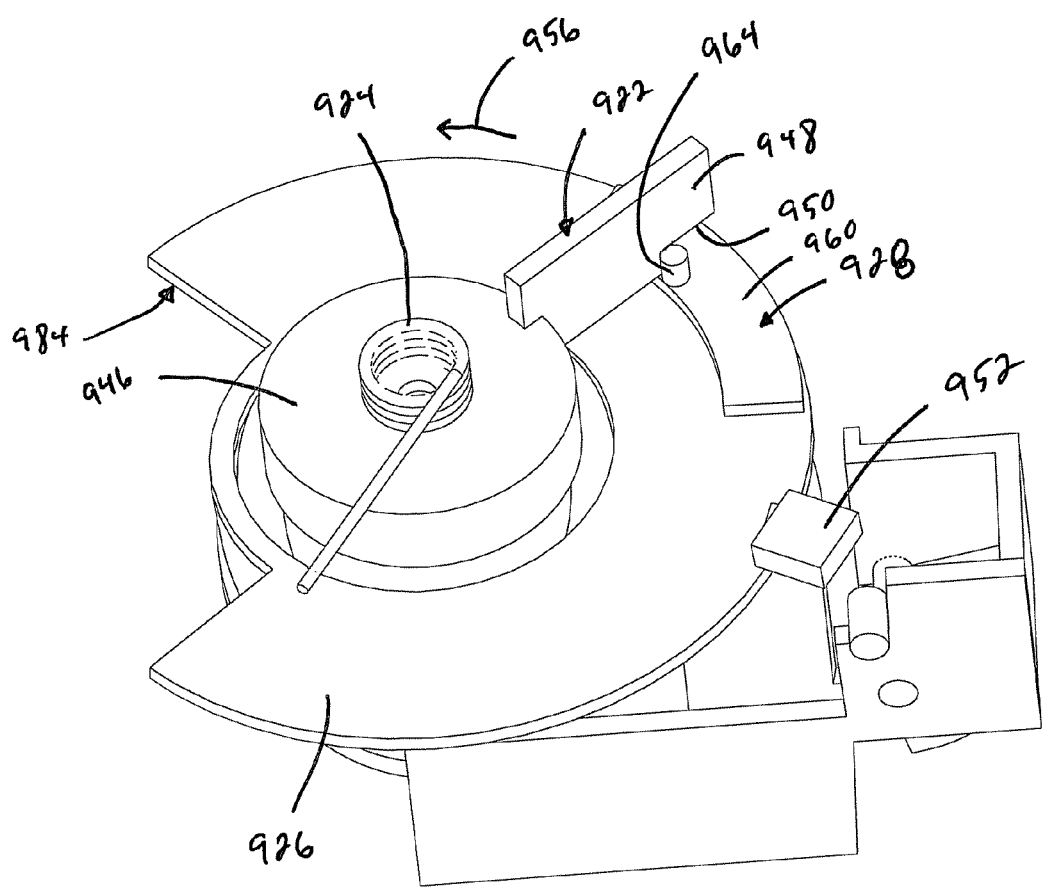
FIG. 11G is a perspective view an underside of parts of a food handler and a food portioner where a cam and drive ring that control the parts are rotated 90 degrees from the home position.

FIGS. 11A-11G illustrate the components of the apparatus 700 in a position where the drive ring 926 and cam 954 have been rotated clockwise 90 degrees from the home position (counter-clockwise in FIG. 11G). Referring to FIGS. 11A and 11B, at this position, the follower 970 and flipper 972 are at or near their highest points. The flipper 972 has moved the portion 114 over the barrier 980 and onto the drive ring 926. The follower 970 is holding the engagement member 1000 of the food detector 902 in an elevated position. The drive ring is moving the food portion beneath the engagement member 1000. Referring to FIGS. 11F and 11G, at the same time, the drive post 964 is in engagement with the paddle 922 and moves the paddle to compress the torsion spring 924. This may be approximately ⅓ of the stroke of the spring.

Figure 12A:
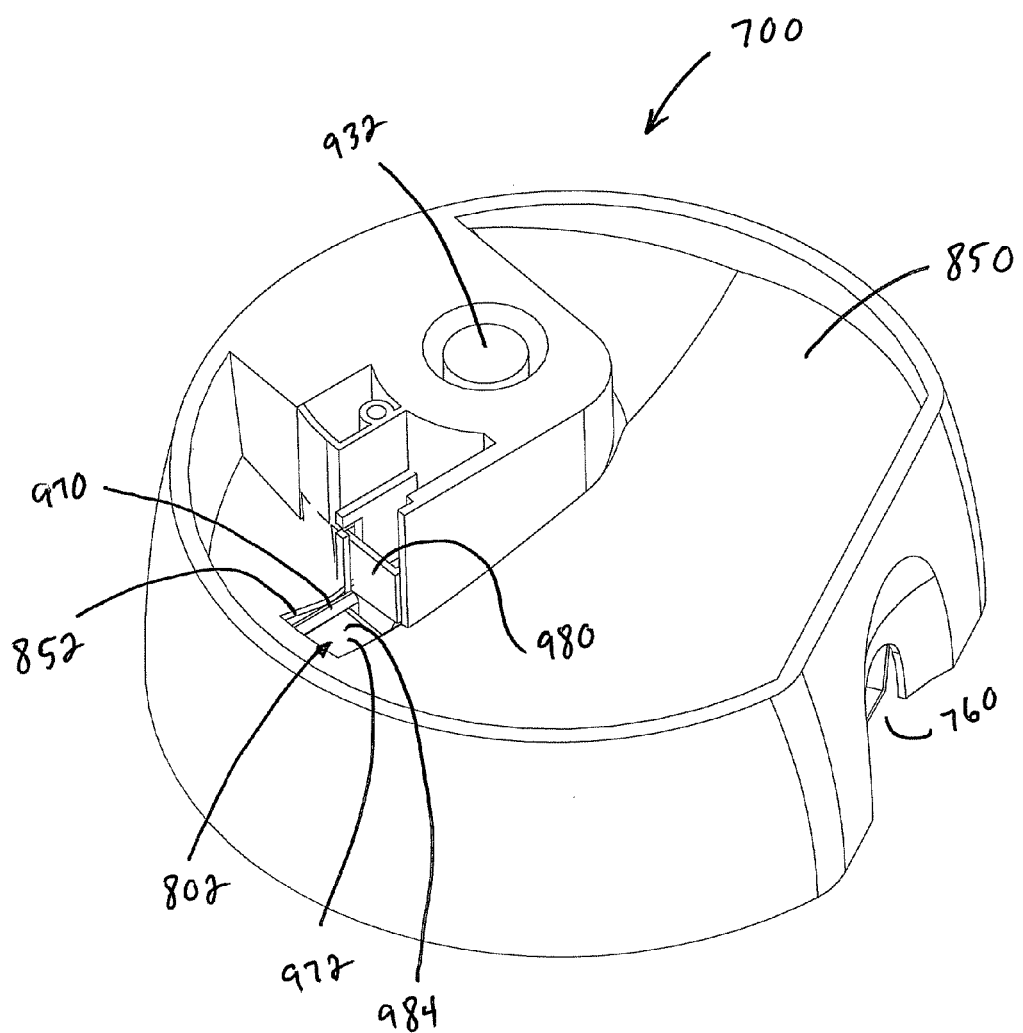
FIG. 12A is a perspective view of parts of the apparatus of FIG. 7A, where a cam and drive ring that control the parts are rotated 180 degrees from the home position.
Figure 12B:
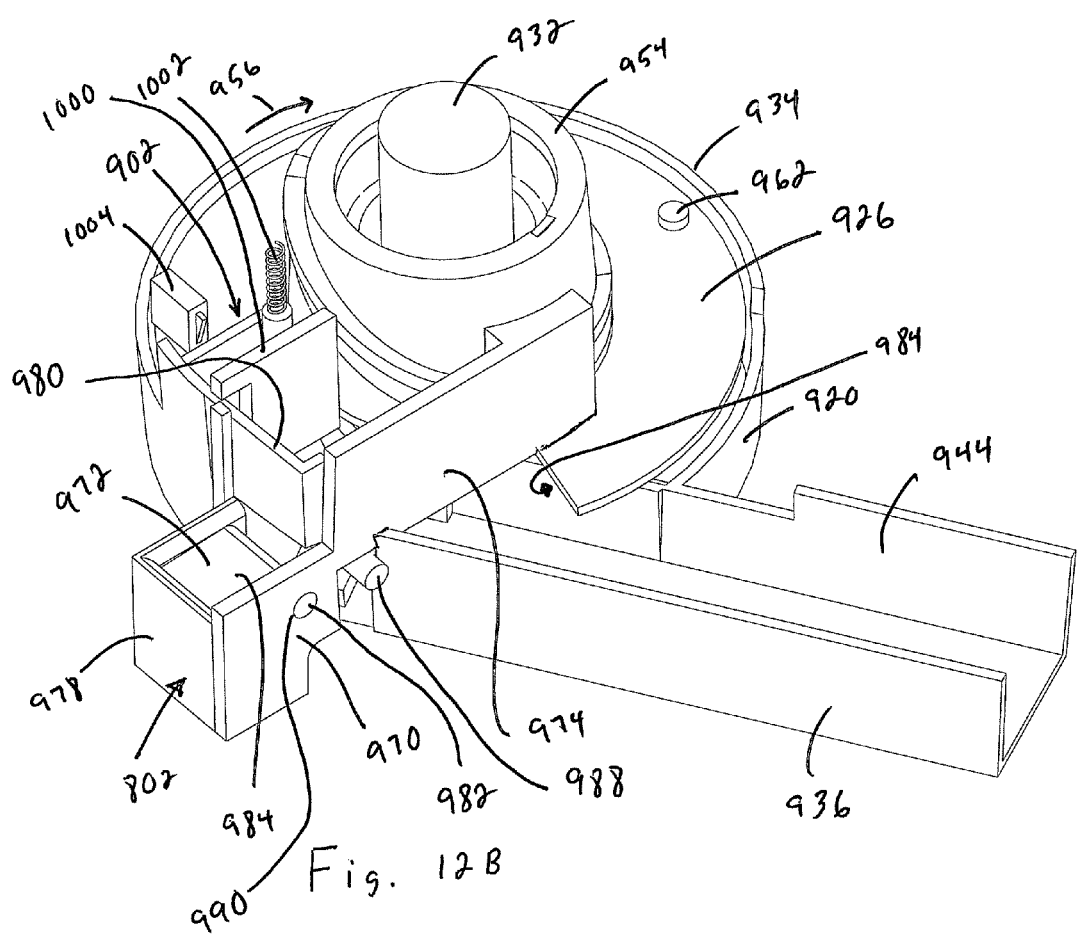
FIG. 12B is a perspective view of parts of a food handler, a food portioner, and a food detector where a cam and drive ring that control the parts are rotated 180 degrees from the home position.
Figure 12C:
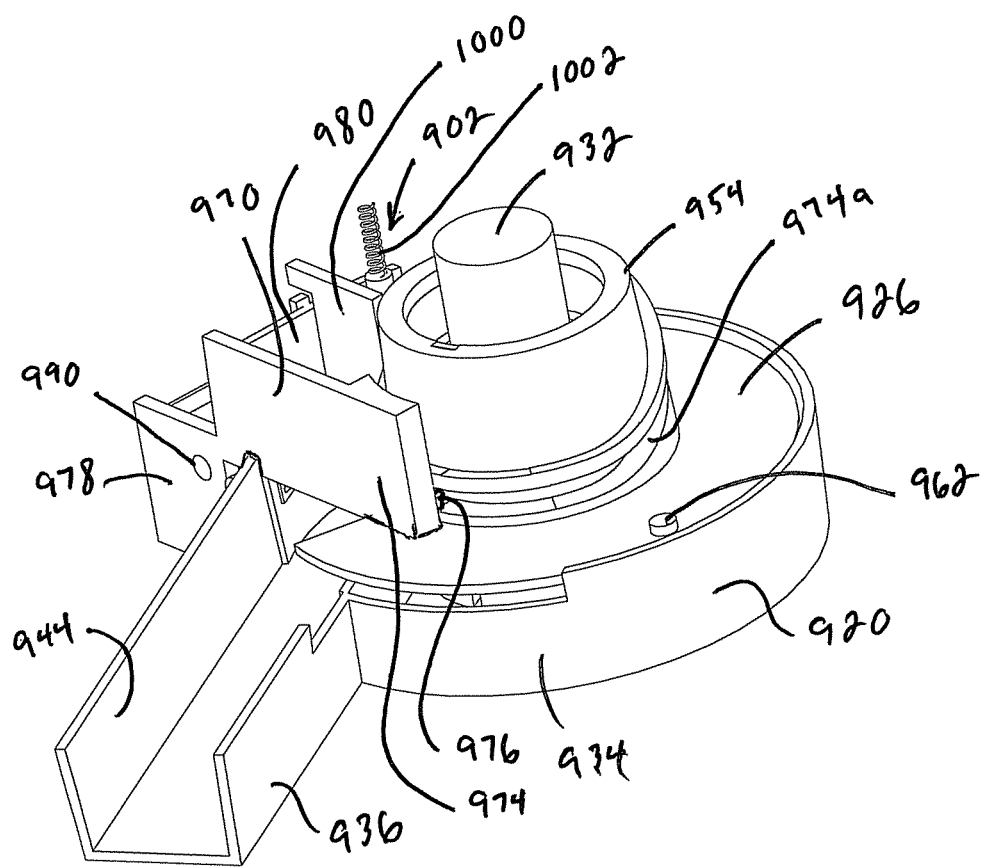
FIG. 12C is a perspective view of parts of a food handler, a food portioner, and a food detector where a cam and drive ring that control the parts are rotated 180 degrees from the home position.
Figure 12:
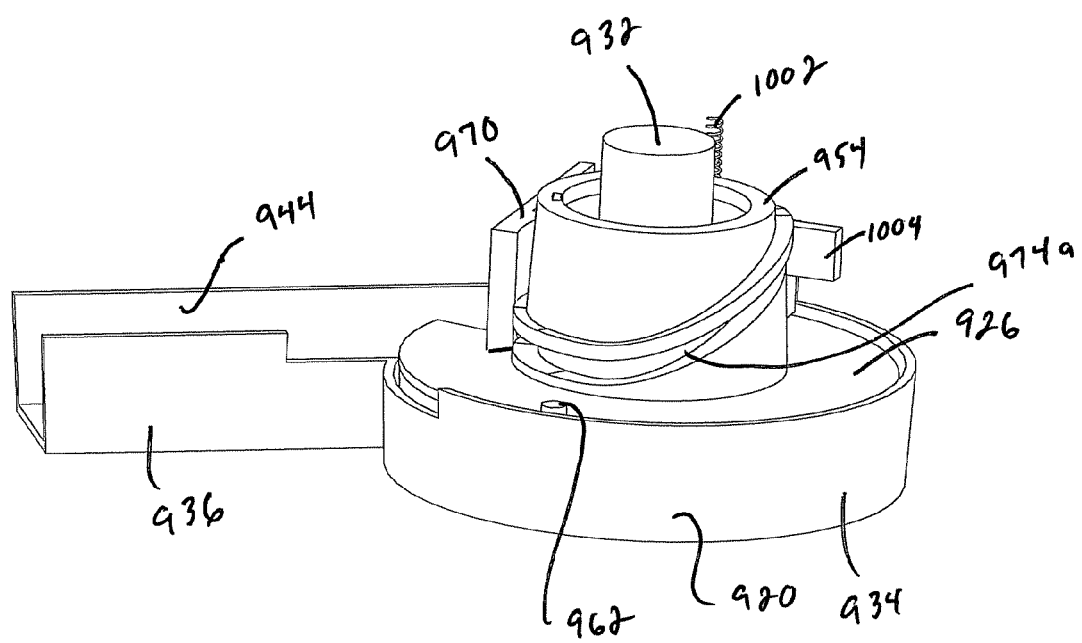
FIG. 12D is a perspective view of parts of a food handler, a food portioner, and a food detector where a cam and drive ring that control the parts are rotated 180 degrees from the home position.
FIG. 12E is a perspective view of parts of a food handler, a food portioner, and a food detector where a cam and drive ring that control the parts are rotated 180 degrees from the home position.
FIG. 12F is a perspective view of parts of a food handler, a food portioner, and a food detector where a cam and drive ring that control the parts are rotated 180 degrees from the home position.
FIG. 12G is a perspective view an underside of parts of a food handler and a food portioner where a cam and drive ring that control the parts are rotated 180 degrees from the home position.
Figure 12E:
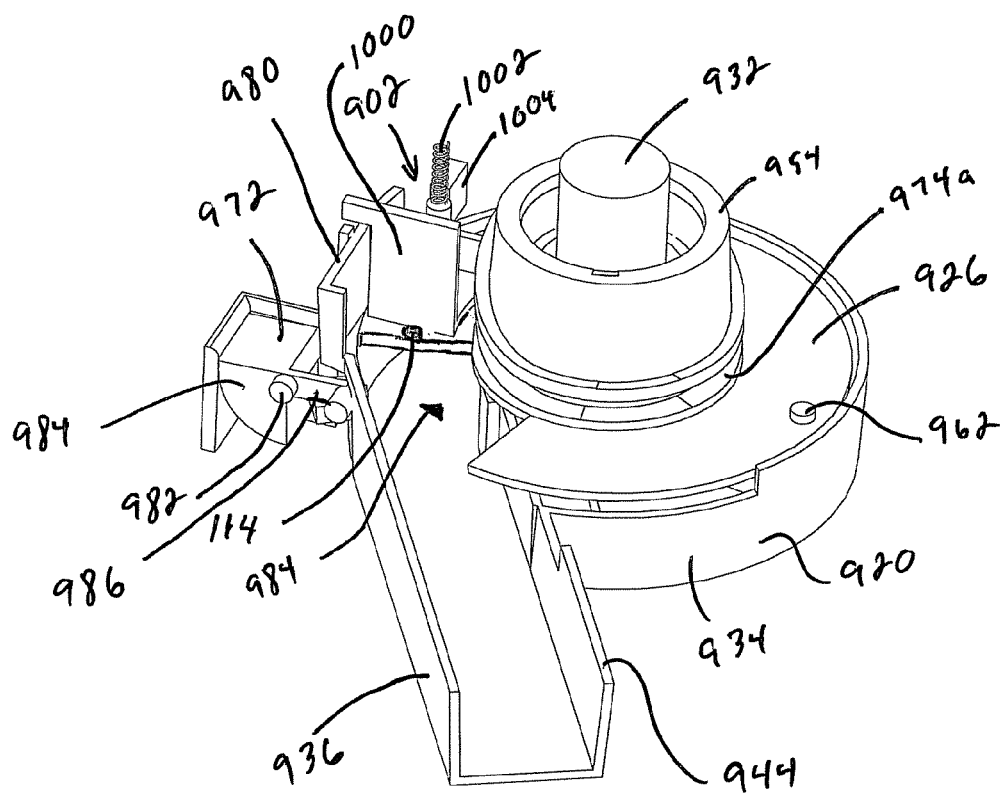
Figure 12F:
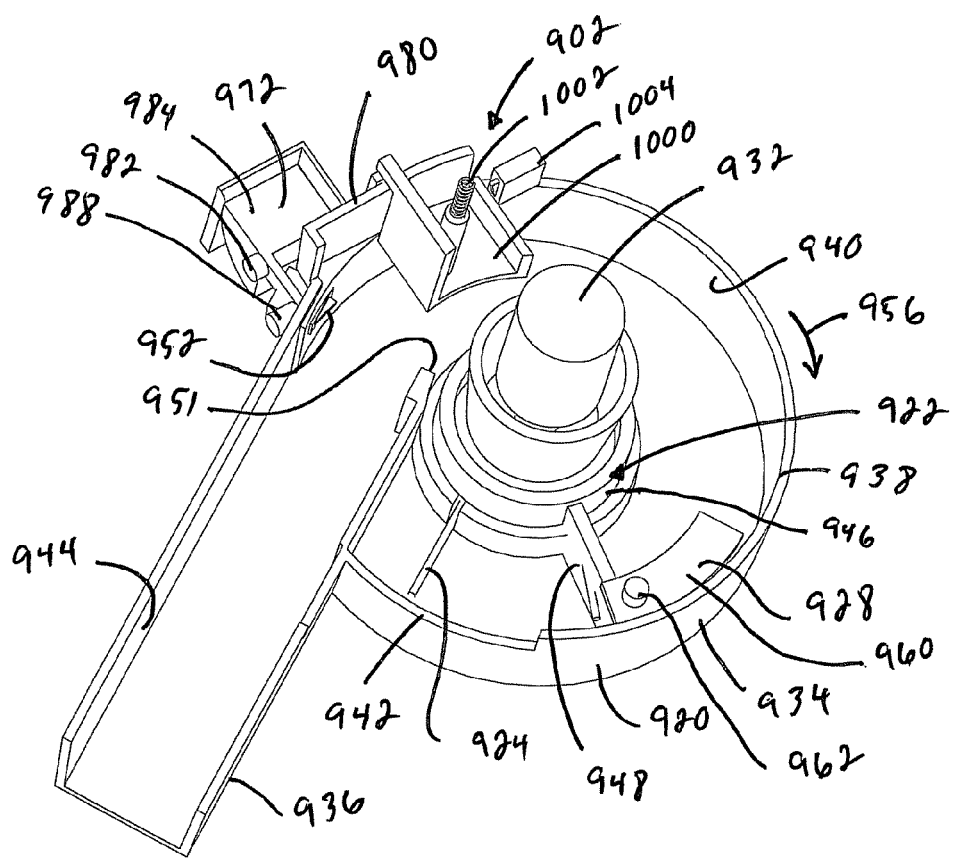
Figure 12G:
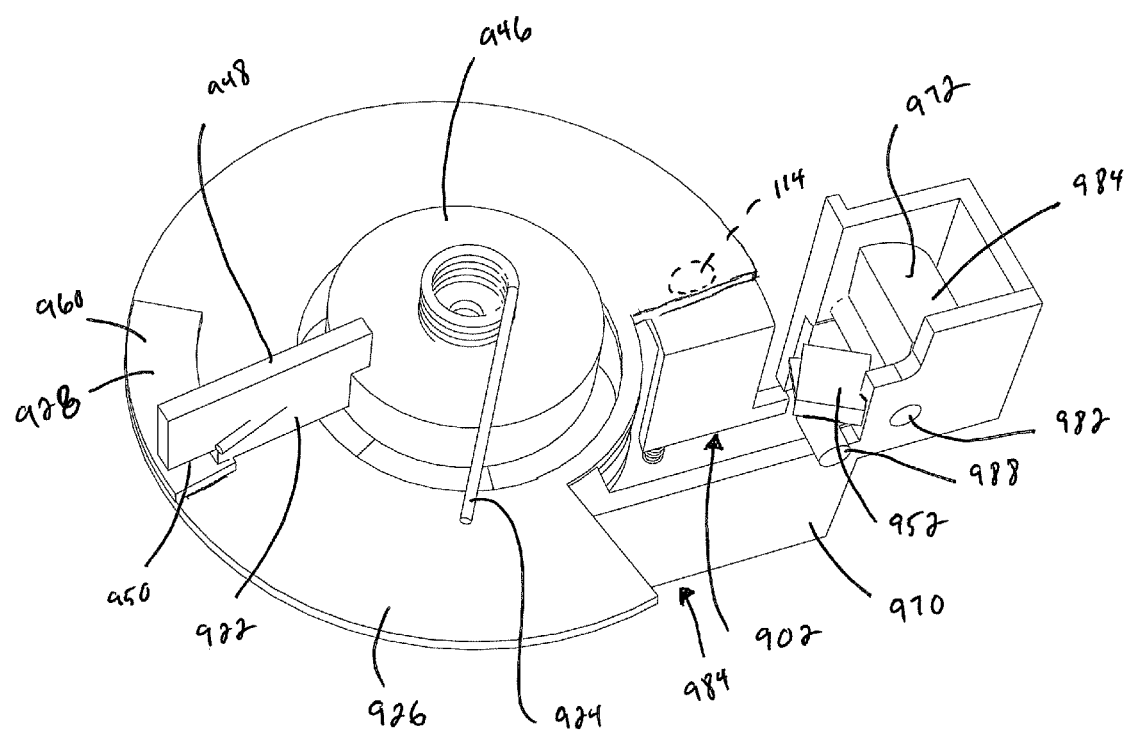
Figure 130:
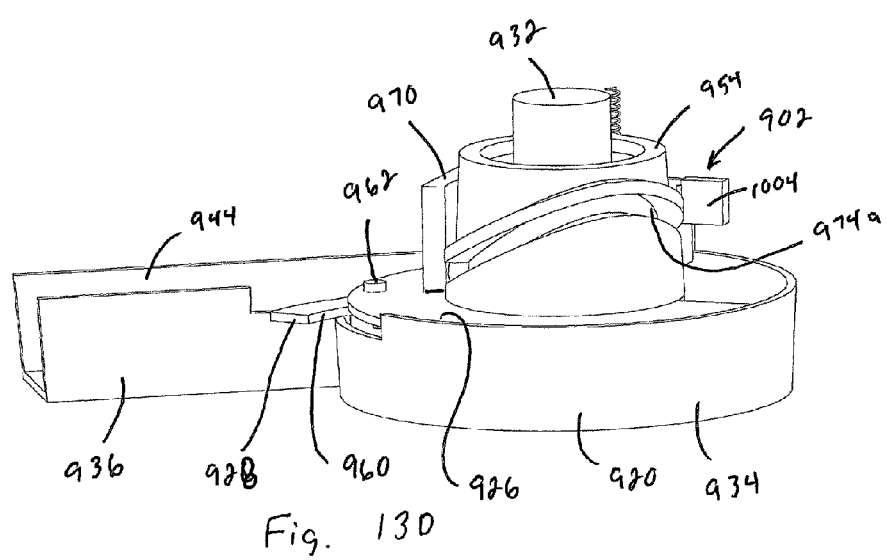

FIGS. 12A-12G illustrate the components of the apparatus 700 in a position where the drive ring 926 and cam 954 have been rotated clockwise 180 degrees from the home position (counter-clockwise in FIG. 12G). Referring to FIGS. 12A and 12B, at this position, the follower 970 and flipper 972 have returned to the lowest point. Referring to FIG. 12E, the engagement member 1000 has been biased into engagement with the food portion to capture the food portion 114 between the engagement member and the drive ring 926. The engagement member 1000 is separated from the follower 970. The sensor 1004 is activated, indicating that food portion has been fed successfully and is ready to be fired or launched. In an exemplary embodiment, if the sensor 1004 did not detect successful feeding of the food portion, the control unit 712 would initiate additional cycles until either a food portion was fed, a fault was detected and/or an empty food hopper 704 is detected. Referring to FIGS. 12F and 12G, the drive post 964 remains in engagement with the paddle 922 and continues to move the paddle to continue to compress the torsion spring 924. This may be approximately ⅔ of the stroke of the spring. Referring to FIG. 12E, the food portion 114 is about to fall through the cutout 984 of the drive ring 926. When the food portion falls through the cutout 984, the food portion will fall on to the track 920 where it will come to rest. The food portion will be in the path of travel of the paddle 922. Upon release, the paddle 922 will impact the food portion and drive the food portion out the food outlet 760 (FIG. 7B).

Figure 13A:
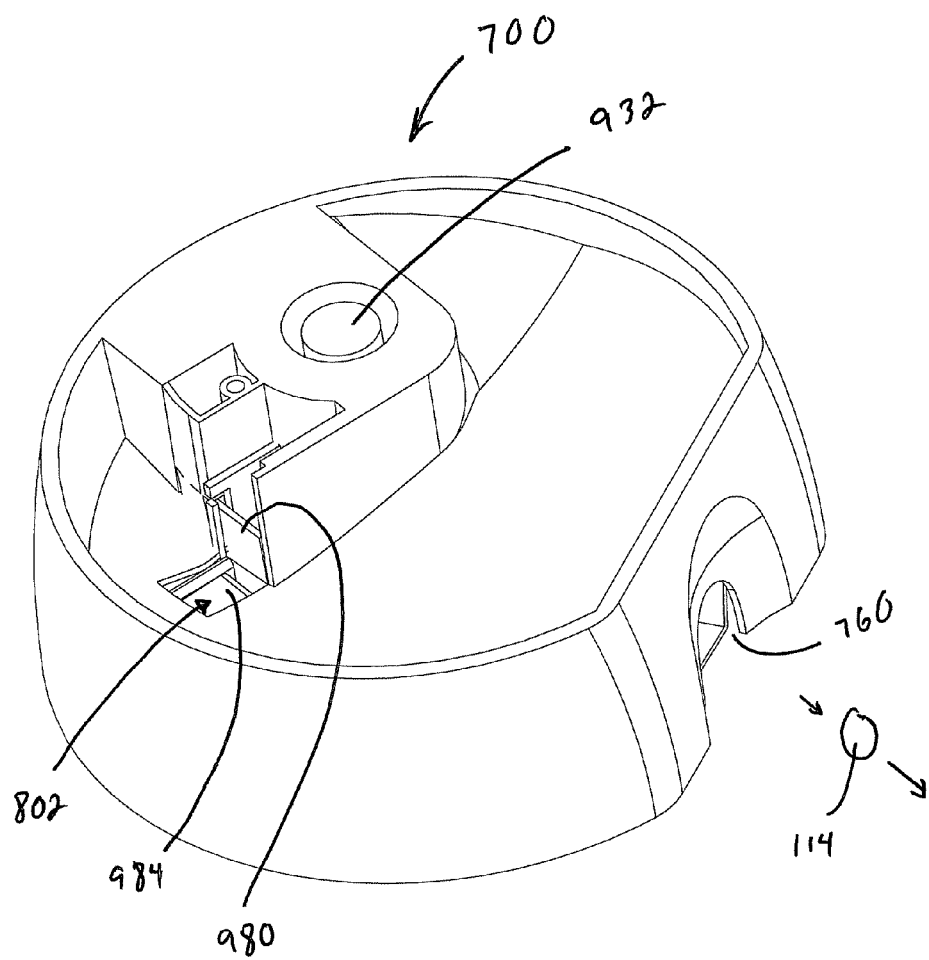
FIG. 13A is a perspective view of parts of the apparatus of FIG. 7A, where a cam and drive ring that control the parts are rotated 180 degrees from the home position.
Figure 13B:
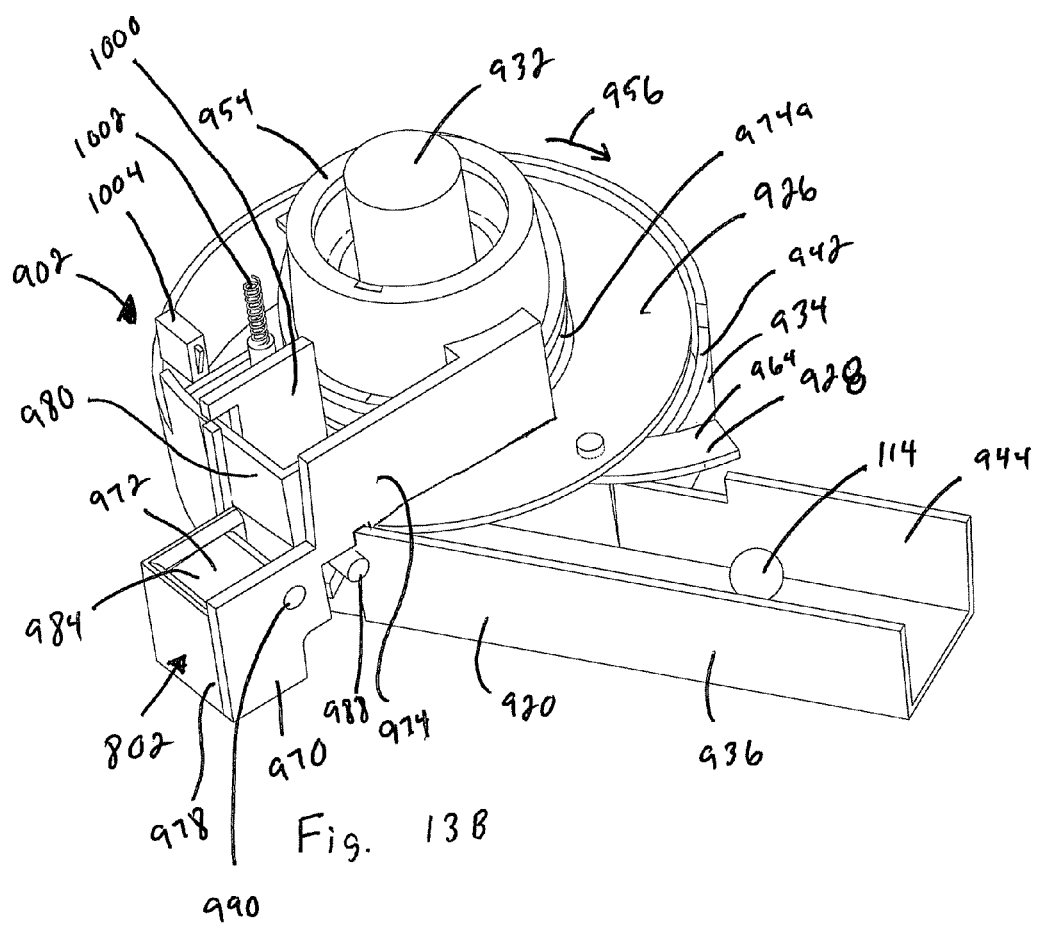
FIG. 13B is a perspective view of parts of a food handler, a food portioner, and a food detector where a cam and drive ring that control the parts are rotated 180 degrees from the home position.
Figure 13C:
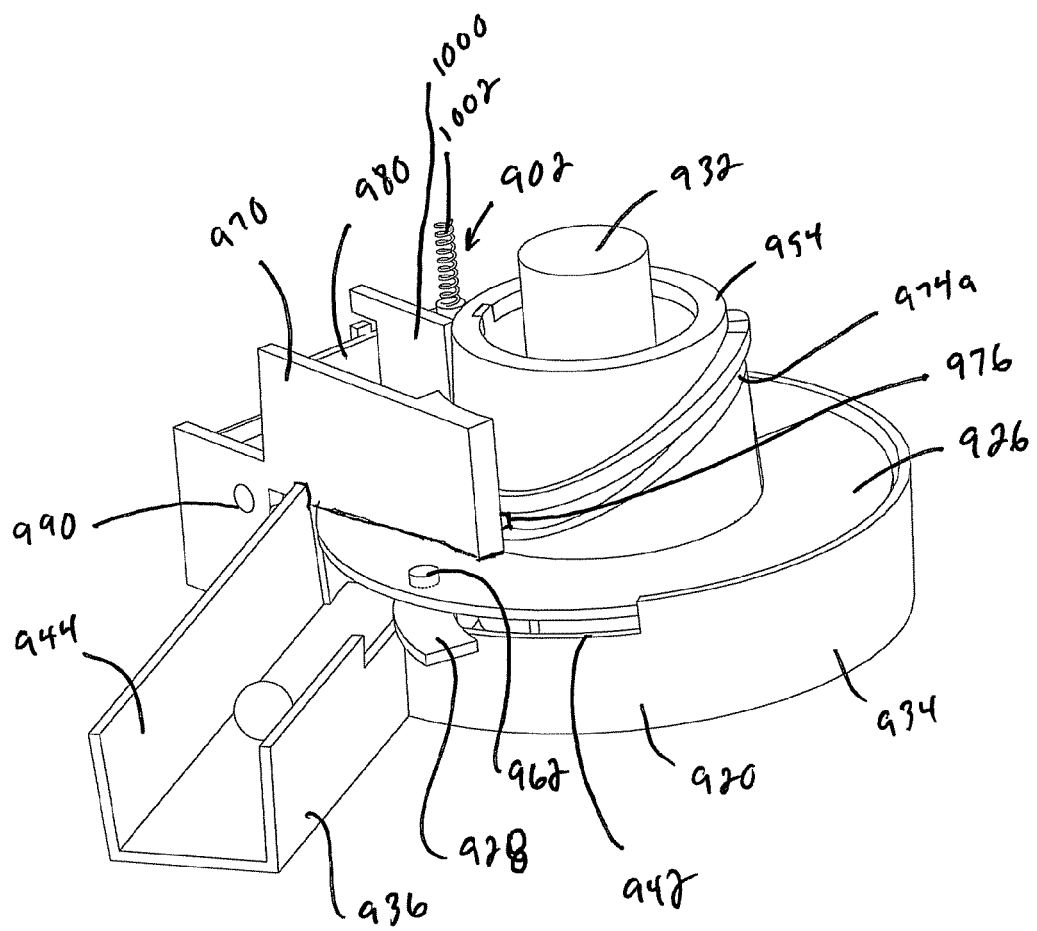
FIG. 13C is a perspective view of parts of a food handler, a food portioner, and a food detector where a cam and drive ring that control the parts are rotated 180 degrees from the home position.
Figure 13E:
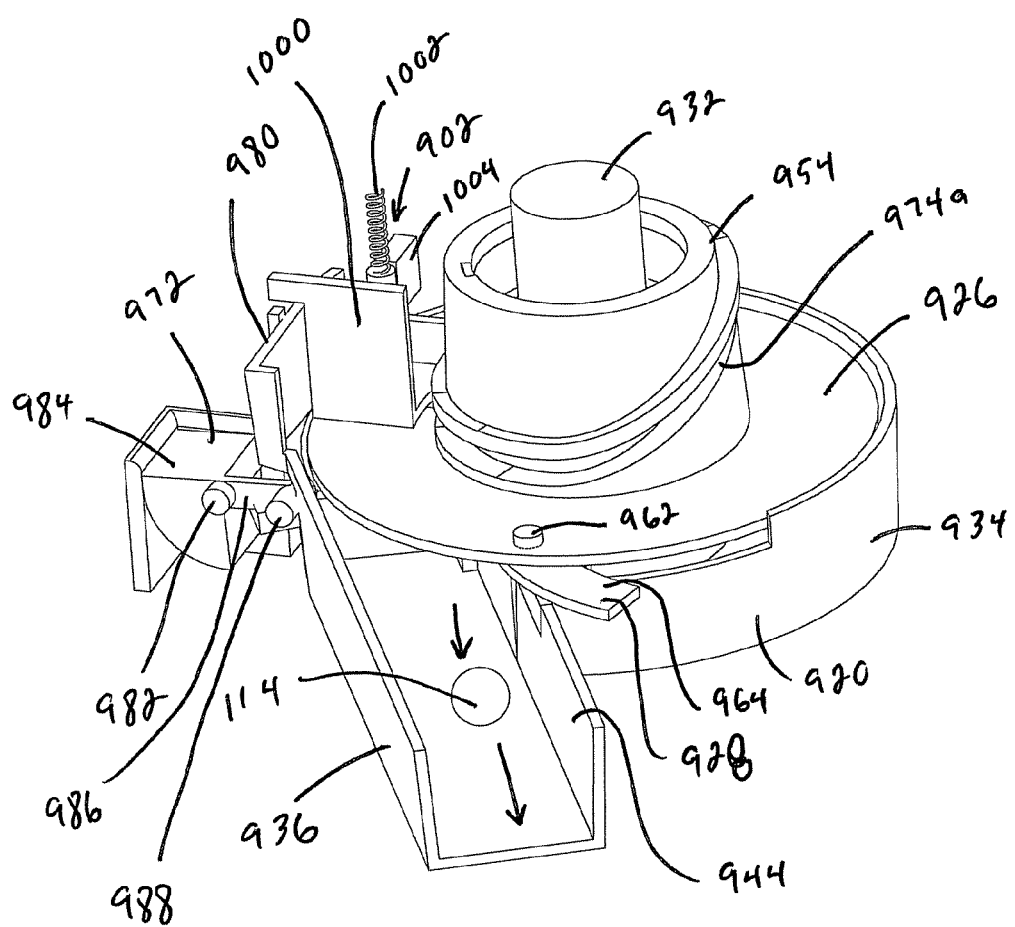
FIG. 13E is a perspective view of parts of a food handler, a food portioner, and a food detector where a cam and drive ring that control the parts are rotated 180 degrees from the home position.
Figure 13F:
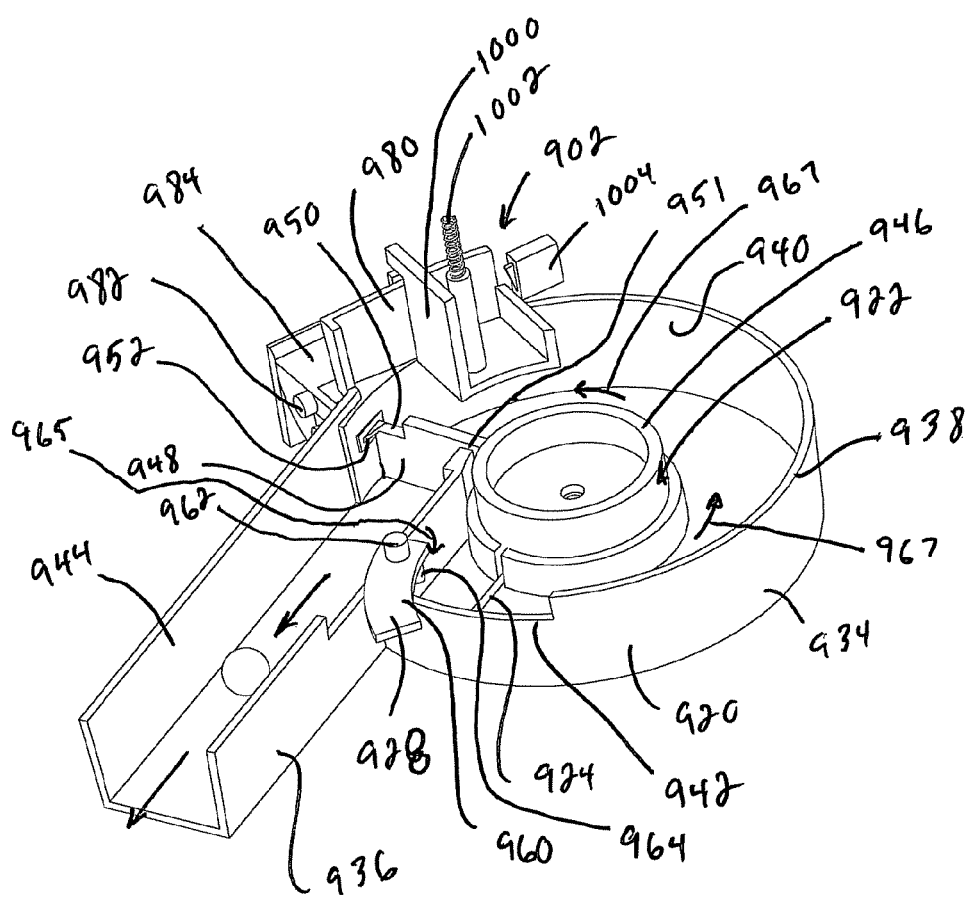
FIG. 13F is a perspective view of parts of a food handler, a food portioner, and a food detector where a cam and drive ring that control the parts are rotated 180 degrees from the home position.
Figure 13G:
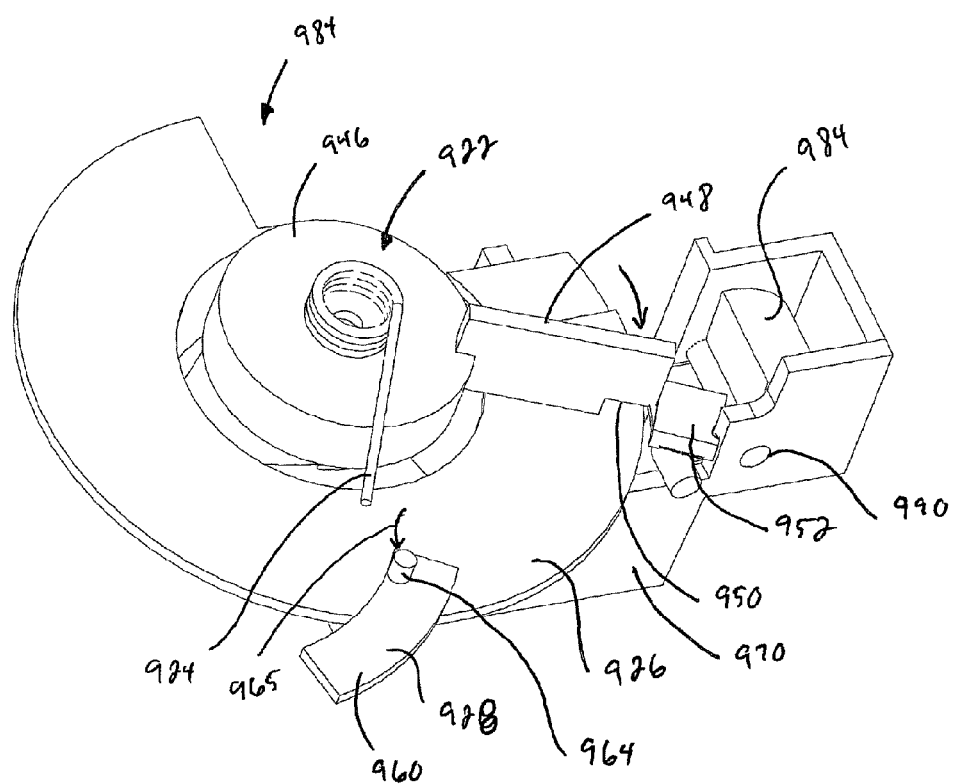
FIG. 13G is a perspective view an underside of parts of a food handler and a food portioner where a cam and drive ring that control the parts are rotated 180 degrees from the home position.

FIGS. 13A-13G illustrate the components of the apparatus 700 in a position where the drive ring 926 and cam 954 have been rotated clockwise 270 degrees from the home position (counter-clockwise in FIG. 13G). At this position, the follower 970, the flipper 972, and the engagement member 100 of the food detector 902 have all returned to the lowest point. Referring to FIG. 13F, the pivoting drive arm 928 has reached the shorter release portion 942 of the track wall 938, allowing the pivoting drive arm to pivot outward. As a result, the drive post 964 pivots into the notch 950 to release the paddle 922. The torsion spring 924 accelerates the paddle 922. The paddle 922 impact the food portion to drive the food portion out the food outlet 760.

Referring again to FIGS. 10A-10G the components of the apparatus 700 return to the home position and the cycle may begin again, depending on whether the controller indicates that additional portions should be dispensed or if it was detected that a portion was not dispensed. Referring to FIG. 10F, the paddle 922 returns to the home position and hits the stop 951. The shock and vibration caused by the paddle 922 impacting the stop will be transmitted through the housing 750 an agitates the supply of food, to ensure that food is continuously provided to the pivot bracket 978 and the flipper 972. The combined effect of the agitation, the sloped surfaces of the bowl, and a slightly recessed position of the flipper with respect to the bowl may assure that the apparatus empties completely without the need for emptying remaining food pellets.

In an exemplary embodiment, the apparatus 700 ejects small portions of dry pet food pellets (approximately 1-6 pellets depending on size) on the ground or within a plastic channel at moderate speed (e.g., 10 ft/sec) in response to an animal activating the animal sensor 716. The pellet(s) roll and bounce along the ground/channel in a manner that simulates fleeing prey. This action stimulates animals with a suitable prey drive, such as dogs and cats, to pursue the pellet(s) and eat it. The sound of the pellet within the channel can amplify this effect.

An animal may activate the apparatus 700 by touching the animal sensor 716, such as a paddle switch, with its nose or paw. This is repeated numerous times over the course of hours with periodic breaks included to avoid overexertion. A preset ration of food is delivered, thereby controlling food intake. The repetitive back and forth motion from the feeder to the pellet provides both mental stimulation as well as exercise without the need for human supervision.

The illustrated apparatus 700 performs the following four functions:

1. Separation of pellets from the layer reposed on the reservoir plate.
2. Confirmation that a pellet is available to be launched.
3. Launching of the pellet.
4. Agitation of the bulk pellet supply to assure steady flow of pellets.

All four functions will normally be performed through one revolution of the drive ring 926. The feeder may cycle multiple times if a pellet is not positioned properly on the first attempt or if the user adjusts the unit for multiple pellet launches from a single switch activation.

The apparatus 700 can successfully launch a broad variety of commercially available food pellets. No specialized shapes or pre-orientation are required. However, range and consistency will vary in response to pellet shape.

The apparatus's 700 sequence of operation is controlled by a user-configurable microprocessor 712 and by mechanical adjustments. Dispense time, frequency, and total number of cycles are adjustable by the owner via a microprocessor. The sensors 952 and 1004 are in communication with the microprocessor 712.

The time required to train an animal to repeatedly self-activate the device may be less than 10 minutes. The switch's position, operation, and presentation, coupled with the immediacy of the reward for successfully activating the switch, encourage & reward curiosity, thereby minimizing the amount of human direction during training.

The animal may be trained in a wide variety of different ways. For example, a food pellet can be waved in front of a cat or dog's face to get their attention, then the pellet is placed under the apparatus. The dog or cat will typically nudge the apparatus to try to expose the pellet. If the cat or dog's nudging (or lack thereof) fails to activate the switch, the owner could lift the feeder a little to expose the pellet. The owner can also keep the activation switch in line with the cat or dog so that when the cat or dog goes after the pellet under the feeder, they hit the switch with their nose. It doesn't take long for the animal to pay a more attention to the pellets coming out of the apparatus and begin actuating the apparatus on their own.

The animal can also be trained in the following manner:
1. the trainer/owner uses a user-interface (See reference numbers 130 or 330 in FIG. 6 for example) to set use parameters for the feeder (select lights/sounds and action upon animal detect);
2. the trainer/owner deposits food into the feeder hopper and activates the unit;
3. the trainer/owner brings the pet over to the filled and activated unit; and
4. repeatedly, the trainer/owner:
    a. by hand actuates the detector on the feeder; and then
    b. indicates to the animal that food was dispensed (e.g., points to the dispensed food).

Training may be accelerated by attracting the animal's attention to the activation switch and providing an immediate reward once the activation switch is pushed. The following features of the exemplary unit promote and reward the animal's interest in the switch:
1. A piezoelectric speaker located behind the switch generates periodic clicks and vibrations that are similar in duration, frequency, and volume to a prey animal (mouse) moving about inside the housing.
2. The motor may be momentarily activated and deactivated to create vibration and noise. The main torsion spring would return the device to the home position during deactivation and no significant advancement of the mechanism would occur
3. A visible LED is mounted behind the activation switch and flashed in concert with the speaker to simulate visible movement of potential prey within the housing.
4. The activation switch is loose-fitting to allow food odors to emanate from around the switch. The housing is splash-proof but not sealed, so food odors will also emanate from other areas, but the animal soon discovers that only actions around the switch result in a reward and consequently tends to focus there.
5. The time between switch closure and pellet ejection may be short, for example approximately ½ of a second. This rapid result reinforces the animal's association between pushing the switch and seeing the pellet eject. The short delay also prevents the animal from moving to block the pellet's egress and thereby defeat much of the exercise benefit.
6. The switch is positioned on the back of the device, in line with the pellet path, to allow the animal to more easily maintain sight of the pellet without blocking the exit point. This additional visual stimulation heightens the drive to pursue the pellet.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, the exemplary device in the following pages may be modified by molding the drive components out of plastic and integrating the functions of the catches and drive arm into a single piece with flexible elements as part of the molding instead of separate springs. Additionally, the steps of methods herein may generally be performed in any order, unless the context dictates that specific steps be performed in a specific order. Therefore, the invention in its broader aspects is not limited to the specific details, representative apparatus and methods, and illustrative examples shown and described. Accordingly, departures may be made from such details without departing from the spirit or scope of the applicant's general inventive concept.

What is claimed is:

1. An apparatus for dispensing animal food, comprising:
    an animal sensor for detecting a triggering action of an animal other than a human;
    a food hopper for containing animal food;
    a food handler operatively connected to the food hopper;
    a food portioner arranged to receive said animal food from said food hopper and automatically transfer portions of said food to said food handler; and
    a control unit operatively connected to at least the animal sensor and the food handler, wherein the control unit provides a signal to the food handler that causes the food handler to launch a portion of the animal food away from the unit in at least a horizontal direction in response to a signal from the animal sensor that indicates detection of said triggering action.

2. The apparatus of claim 1 further comprising a food detector operatively connected to the food portioner to detect that one or more portions of food have been transferred by the food portioner to the food handler.

3. The apparatus of claim 2 wherein the control unit, the food detector, and the food handler cooperate to ensure that a portion of animal food is launched in response to detection of a triggering action of the animal.

4. The unit for dispensing animal food according to claim 3,
    wherein the animal sensor is capable of detecting at least one of the following: the animal touching the apparatus and the animal placing it's snout in an opening of the apparatus;
    wherein the food handler is capable of launching the food at least five feet horizontally away from the apparatus;
    wherein the control unit is configured to perform at least one of the following: cause the food handler to launch a predetermined number of animal food portions responsive to one triggering action, cause the food handler to launch a random number of animal food portions responsive to one triggering action, and cause the food handler to launch a user-selectable number of animal food portions responsive to one triggering action.

5. The apparatus of claim 1 wherein the food handler is operable to launch said portion of animal food away from the unit in a substantially horizontal direction.

6. The apparatus of claim 5, wherein the apparatus will cycle and the paddle will dry fire if a portion of the animal food is not in position to be launched away from the apparatus to agitate the animal food in the food hopper.

7. The apparatus of claim 1 wherein the animal sensor is capable of detecting at least one of the following: the animal touching the apparatus and the animal placing it's snout in an opening of the apparatus.

8. The apparatus of claim 1 wherein the food handler is capable of launching the food at least five feet horizontally away from the apparatus.

9. The apparatus of claim 1 wherein the control unit is configured to perform at least one of the following: cause the food handler to launch a predetermined number of animal food portions responsive to one triggering action, cause the food handler to launch a random number of animal food portions responsive to one triggering action, and cause the food handler to launch a user-selectable number of animal food portions responsive to one triggering action.

10. The apparatus of claim 1 further comprising a food portion availability signaling arrangement that provides an indication to the animal that a food portion is available for launching by the food handler.

11. The apparatus of claim 10 food portion availability signaling arrangement comprises at least one of the following: a sound producing device, a light emitting device, and a control unit output that causes said food handler to move.

12. The apparatus of claim 1 further comprising a movable food detector moved by the arm, wherein a food detector sensor senses a portion of the food detector if a portion of the animal food is not in position to be launched away from the apparatus.

13. A unit for dispensing animal food, comprising:
an animal sensor for detecting a triggering action of an animal;
a food hopper for containing animal food operatively connected to a food handler that launches a portion of the animal food substantially horizontally away from the unit in response to detection of a triggering action of the animal;
a food portioner operatively connected to the food hopper for transferring a portion of food from the hopper to the food handler;
a food detector operatively connected to the food handler to detect that a portion of food has been transferred by the food portioner; and
a control unit operatively connected to at least the animal sensor, the food detector, and the food handler; and
wherein the control unit, the food detector, and the food handler cooperate to ensure that a portion of animal food is launched in response to detection of a triggering action of the animal.

14. The unit for dispensing animal food according to claim 13, wherein the animal sensor is capable of detecting at least one of the following: the animal touching the unit and the animal placing it's snout in an opening of the unit.

15. The unit for dispensing animal food according to claim 13, wherein the food handler is capable of launching the food at least five feet horizontally away from the unit.

16. The unit for dispensing animal food according to claim 13 wherein the control unit is configured to perform at least one of the following: cause the food handler to launch a predetermined number of animal food portions responsive to one triggering action, cause the food handler to launch a random number of animal food portions responsive to one triggering action, and cause the food handler to launch a user-selectable number of animal food portions responsive to one triggering action.

17. The unit for dispensing animal food according to claim 13,
wherein the animal sensor is capable of detecting at least one of the following: the animal touching the unit and the animal placing the animal's snout in an opening of the unit;
wherein the food handler is capable of launching the food at least five feet horizontally away from the unit;
wherein the control unit is configured to perform at least one of the following: cause the food handler to launch a predetermined number of animal food portions responsive to one triggering action, cause the food handler to launch a random number of animal food portions responsive to one triggering action, and cause the food handler to launch a user-selectable number of animal food portions responsive to one triggering action.

18. An apparatus for dispensing animal food, comprising:
an animal sensor for detecting a triggering action of an animal other than a human, wherein the animal sensor is a switch located away from a food exit of the apparatus;
a food hopper for containing animal food;
a food handler operatively connected to the food hopper, wherein the food handler comprises an actuator operatively coupled to an arm and a paddle connected to a spring; and
a control unit operatively connected to at least the animal sensor and the food handler; and
wherein the control unit provides a signal to the food handler that causes the food handler to launch a portion of the animal food out of the food exit and away from the apparatus in at least a horizontal direction in response to a signal from the animal sensor that indicates detection of the triggering action;
wherein in response to the signal from the control unit, the actuator of the food handler rotates the arm in a first direction such that a catch of the arm engages a portion of the paddle to rotate the paddle in the first direction from a ready position to a launch position;
wherein the spring is tensioned as the paddle is moved from the ready position to the launch position;
wherein in the launch position, the catch of the arm releases the paddle such that a force provided by the spring moves the paddle in a second direction opposite the first direction to launch the portion of the animal food out of the food exit and away from the apparatus.

19. The apparatus of claim 18, wherein a bottom of the food hopper comprises a movable hopper plate, and wherein a portion of the paddle engages a portion of the hopper plate when the portion of the animal food is launched away from the apparatus to move the hopper plate and agitate the animal food contained in the food hopper.

* * * * *